(12) United States Patent
Campbell et al.

(10) Patent No.: US 9,046,981 B2
(45) Date of Patent: Jun. 2, 2015

(54) TRIP AND TRAVEL TOOL

(75) Inventors: Cheryl Ann Campbell, Centerville, MN (US); Erika Marie Rinkleff, Minneapolis, MN (US); Sarah Lynn Devens, Lakeville, MN (US); Nachiket Prabhakar Katti, Minneapolis, MN (US); David Mark Plante, Minneapolis, MN (US); Tamara K. Blank, Kew Gardens, NY (US); Meagan Elizabeth Funches, New York, NY (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 13/401,499

(22) Filed: Feb. 21, 2012

(65) Prior Publication Data

US 2013/0219334 A1 Aug. 22, 2013

(51) Int. Cl.
*G06F 3/048* (2013.01)
*G06Q 50/14* (2012.01)
*G06Q 10/06* (2012.01)
*G06F 3/0482* (2013.01)
*G06F 3/0481* (2013.01)
(Continued)

(52) U.S. Cl.
CPC .......... *G06F 3/048* (2013.01); *G06Q 10/06* (2013.01); *G06F 3/0482* (2013.01); *G06F 3/0481* (2013.01); *G01C 21/343* (2013.01); *G06Q 10/025* (2013.01); *G06Q 50/14* (2013.01)

(58) Field of Classification Search
CPC . G06F 3/04842; G06F 3/0482; G06F 3/0481; G06Q 10/06; G06Q 50/12; G06Q 10/025; G01C 21/343

USPC ............... 715/810, 799; 701/26, 411
See application file for complete search history.

(56) References Cited

U.S. PATENT DOCUMENTS

| 7,017,118 B1 | 3/2006 | Carroll |
| 7,117,451 B2 | 10/2006 | Sielken |
| 7,689,933 B1 | 3/2010 | Parsons |

(Continued)

FOREIGN PATENT DOCUMENTS

| WO | 00/41104 | 7/2000 |
| WO | 01/46916 | 6/2001 |
| WO | 2011/020209 | 2/2011 |

OTHER PUBLICATIONS

Chitu, "More Options for Printing Directions in Google Maps", Jul. 30, 2008, [Retrieved on Dec. 6, 2013], Retrieved from the Internet <URL: googlesystem.blogspot.com/2008/07/more-options-for-printing-directions-in.html/>.*

(Continued)

*Primary Examiner* — Patrick Riegler
*Assistant Examiner* — Mong-Shune Chung
(74) *Attorney, Agent, or Firm* — Nixon & Vanderhye P.C.

(57) ABSTRACT

A server transmits a first page to be displayed. The first page includes a location entry representing a location to visit on a trip and at least two map elements, the two map elements and location entry being organized as a list in a first order on the first page. A request to move a selected map element of the two map elements within the list is received. Parameters of the selected map element are changed to form changed parameters that change the position of the selected map element within the list. The server transmits a second page to be displayed based on the changed parameters, the second page comprising the location entry and the two map elements organized as a second list in a second order.

11 Claims, 31 Drawing Sheets

(51) Int. Cl.
*G01C 21/34* (2006.01)
*G06Q 10/02* (2012.01)

(56) References Cited

U.S. PATENT DOCUMENTS

| | | |
|---|---|---|
| 8,032,402 B2 | 10/2011 | Aleksiejczyk et al. |
| 8,296,686 B1 * | 10/2012 | Tedesco et al. ............... 715/865 |
| 2003/0182052 A1 | 9/2003 | DeLorme et al. |
| 2004/0019511 A1 | 1/2004 | McKinney |
| 2004/0078257 A1 | 4/2004 | Schweitzer et al. |
| 2004/0225539 A1 | 11/2004 | Pilaar et al. |
| 2006/0235739 A1 | 10/2006 | Levis et al. |
| 2006/0235863 A1 * | 10/2006 | Khan ............................ 707/101 |
| 2006/0271277 A1 * | 11/2006 | Hu et al. ....................... 701/202 |
| 2006/0277079 A1 | 12/2006 | Gilligan et al. |
| 2007/0073562 A1 | 3/2007 | Brice et al. |
| 2007/0088897 A1 | 4/2007 | Wailes et al. |
| 2007/0185744 A1 | 8/2007 | Robertson |
| 2007/0250372 A1 | 10/2007 | Arbouzov |
| 2008/0103821 A1 | 5/2008 | Cerbone et al. |
| 2009/0012799 A1 | 1/2009 | Hornthal et al. |
| 2009/0043674 A1 | 2/2009 | Minsky et al. |
| 2009/0265197 A1 * | 10/2009 | Chan .................................. 705/7 |
| 2009/0313679 A1 | 12/2009 | McAfee et al. |
| 2010/0030612 A1 | 2/2010 | Kim et al. |
| 2011/0035143 A1 | 2/2011 | Lee |
| 2011/0055043 A1 | 3/2011 | Shuchman et al. |
| 2011/0301835 A1 * | 12/2011 | Bongiorno .................... 701/201 |
| 2012/0185793 A1 * | 7/2012 | Binsztok ....................... 715/772 |

OTHER PUBLICATIONS

Marathon_seven, "The locations in my custom map won't stay in the order that I save them in. Every time I leave, they re-order again", Sep. 12, 2011, Retrieved from the Internet <URL: https://productforums.google.com/forum/#!topic/maps/VDK_NK5Ri_8/>, p. 1-2.*
Office Action from Canadian Patent Application No. 2,794,253, mailed Jan. 30, 2013 (7 pages).
Office Action from Canadian Patent Application No. 2,794,253, mailed Jul. 5, 2013 (10 pages).
Office Action from Canadian Patent Application No. 2,794,253, mailed Dec. 17, 2013 (14 pages).
Office Action from Canadian Patent Application No. 2,794,253, mailed Apr. 25, 2014 (26 pages).

* cited by examiner

TRIP AND TRAVEL TOOL

BACKGROUND

Travel itineraries describe locations that are to be visited during a trip. Some itineraries include maps that show the geographic position of the locations. Creating such itineraries for business travel can be time consuming, especially when there are a large number of locations to visit or when the traveler is unfamiliar with the area.

The discussion above is merely provided for general background information and is not intended to be used as an aid in determining the scope of the claimed subject matter. The claimed subject matter is not limited to implementations that solve any or all disadvantages noted in the background.

SUMMARY

A server transmits a first page to be displayed. The first page includes a location entry representing a location to visit on a trip and at least two map elements, the two map elements and location entry being organized as a list in a first order on the first page. A request to move a selected map element of the two map elements within the list is received. Parameters of the selected map element are changed to form changed parameters that change the position of the selected map element within the list. The server transmits a second page to be displayed based on the changed parameters, the second page comprising the location entry and the two map elements organized as a second list in a second order.

In accordance with a further embodiment, a request for a page of itineraries associated with a user is received and in response to the request a set of itineraries created and explicitly saved by the user is identified; a set of shared itineraries that were shared with the user by other users is identified; and a set of itineraries created by the user but not explicitly saved by the user is identified. A page that includes entries for each itinerary in the set of itineraries created and explicitly saved by the user, for each itinerary in the set of itineraries shared with the user, and for each itinerary in the set of itineraries created by the user but not explicitly saved by the user is constructed and then the page is transmitted.

In accordance with a further embodiment, a server transmits a page comprising a list of itineraries shared with a user. A request to edit shared itinerary is received. A page is transmitted that displays the shared itinerary and at least one control that is selectable by the user to indicate an itinerary modification. A request for an itinerary modification is received. Based on the request, the shared itinerary is copied to create a new itinerary and the new itinerary is changed in accordance with the request for itinerary modification without changing the shared itinerary.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 12 is an example of a build itinerary page with a location added to the bottom of the build itinerary page.

FIG. 13 is an example of a hover popup window on a build itinerary page.

FIG. 15 is an example of a build itinerary page after an all locations link has been selected.

FIG. 21 shows a customized itinerary page after the addition of a text separator.

FIG. 29 is an example of a create/edit location page.

DETAILED DESCRIPTION

This is a trip and travel tool that simplifies the process of generating and sharing itineraries. An administrator defines a set of areas where travelers are likely to visit and within each area defines a set of locations that travelers may wish to visit. Travelers construct itineraries by selecting an area to visit and then selecting locations within the area. After locations have been added to an itinerary, the traveler may change the order of the locations within the itinerary and may add one or more maps to the itinerary. The location of the maps within the itinerary may be shifted by the user. The user may also enter text blocks within the itinerary to provide additional information and these text blocks may be shifted within the itinerary as desired by the user. Once an itinerary is constructed, a user may share the itinerary with other users. This may be done by e-mailing a Portable Document Format (PDF) of the itinerary or by emailing a link to the itinerary itself. When a user receives a shared itinerary, they may open the itinerary and edit it. If the itinerary is protected, the changes made to the itinerary are automatically saved as a new itinerary. If the itinerary is not protected, the changes made to the shared itinerary are saved within the shared itinerary and the shared itinerary is changed for all users that have access to the shared itinerary.

Figure 1:
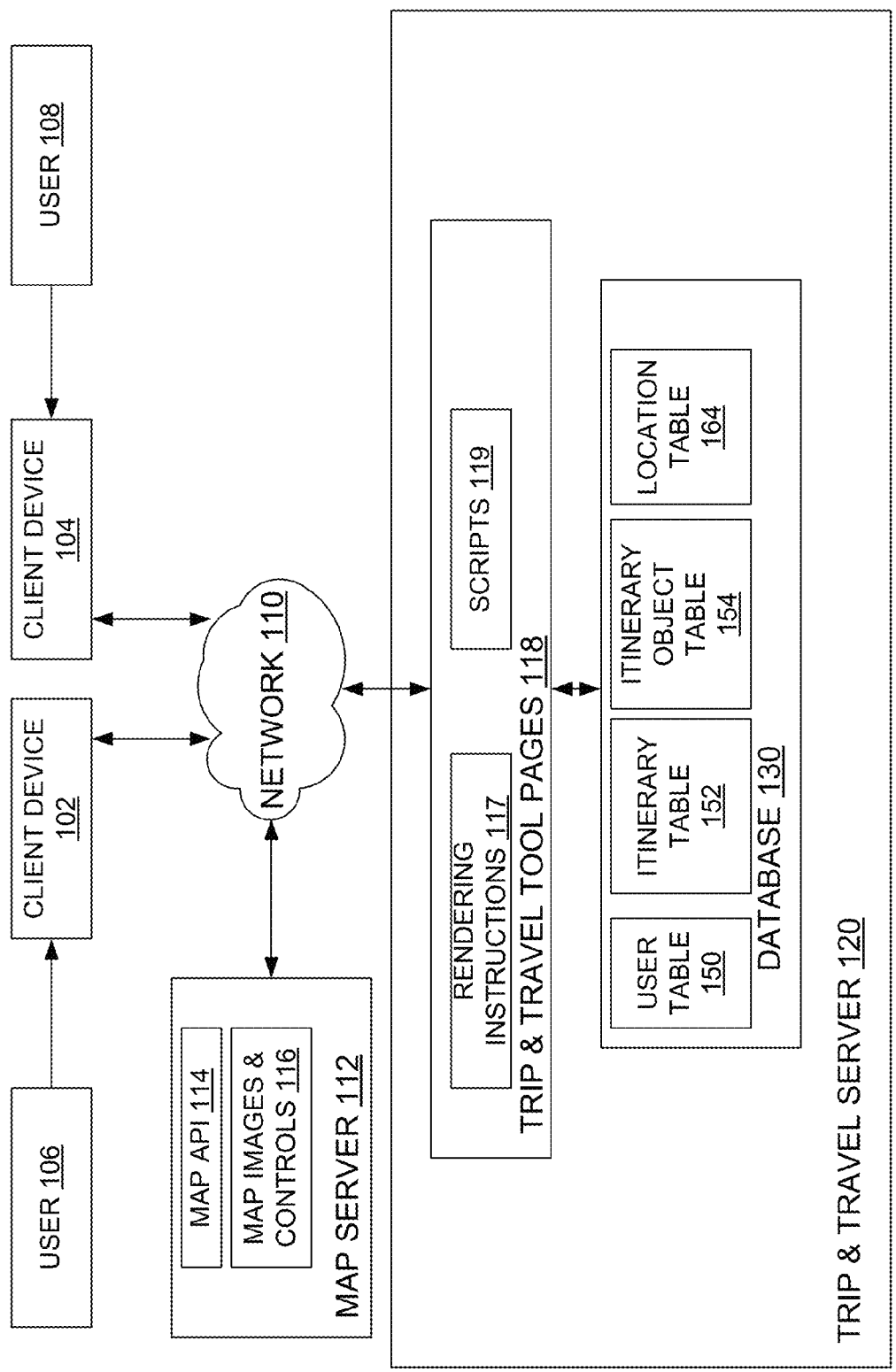
FIG. 1 is a block diagram of computing devices and systems used to implement the trip and travel tool.

FIG. 1 provides a block diagram of elements used to implement the trip and travel tool. In FIG. 1, the trip and travel tool is implemented as a set of trip and travel tool pages 118 that are stored on a trip and travel server 120 and that interact with one or more tables in a database 130. The trip and travel tool pages 118 include rendering instructions 117, which are used to render information on a client device, and scripts 119, which are executable code to implement some of the functionality of the trip and travel tool.

Database 130 includes a user table 150, an itinerary table 152, an itinerary object table 154, an area table 156 and a location table 164. User table 150 includes information about each user who has access to the trip and travel tool. Itinerary table 152 contains information about each of the itineraries stored in the trip and travel tool. Itinerary object table 154 includes information about individual objects that are stored in each itinerary, including the position of the itinerary object within the itinerary. Area table 156 includes a list of areas and their associated metro areas, states and countries. In area table 156, the bounds of each area in longitude and latitude coordinates are stored. Location table 164 includes information about each location, including the area it is located in, the name of the location, whether the location is active, the address of the location, the phone number of the location, the website associated with the location, the hours of operation of the location and the categories that the location falls within. The location table may also include a uniform resource locator that describes the location of an image of the location.

Trip and travel tool pages 118 are served through a network 110 by server 120 to one or more client devices such as client devices 102 and 104, which are operated by respective users 106 and 108. Client devices 102 and 104 include one or more displays on which trip and travel tool pages 118 are viewed. Client devices 102 and 104 also include input devices such as keyboards, pointing devices and touch screens that allow users 106 and 108 to interact with the trip and travel tool pages 118.

In accordance with some embodiments, trip and travel tool pages 118 include embedded map elements that reference map images and controls 116 stored on a map server 112, which are requested using one or more map APIs 114. Map APIs 114 are also used to request new map images 116 based on user interactions with one or more of the map controls. For example, if a user manipulates a geometric translation control on the map, client device 102 provides the translation input in a call to a map API 114. In response, map API 114 returns a new map image 116 corresponding to the shift in the image of the map.

Figure 2:
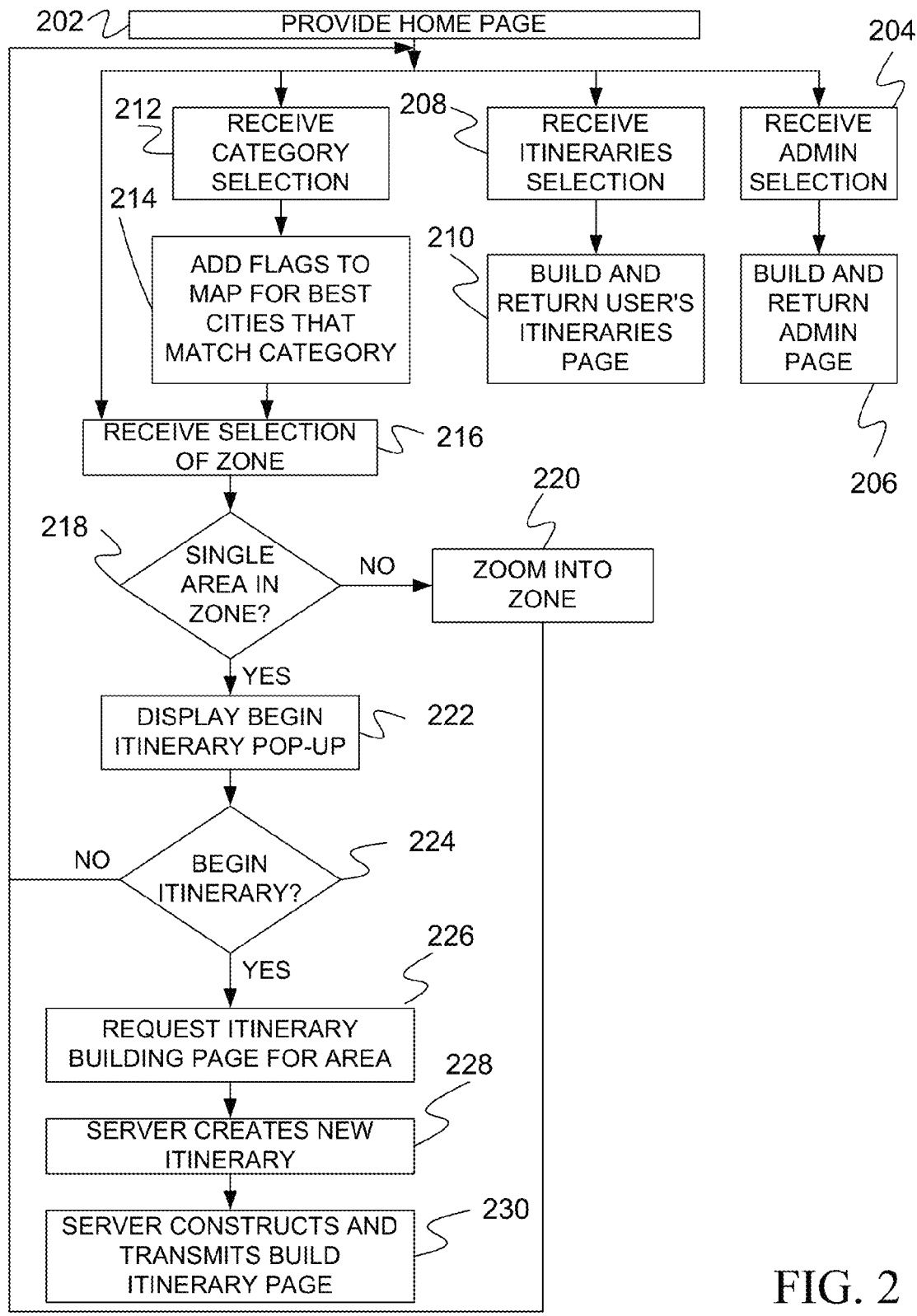
FIG. 2 is a flow diagram of operations that can be performed from a home page.
Figure 3:
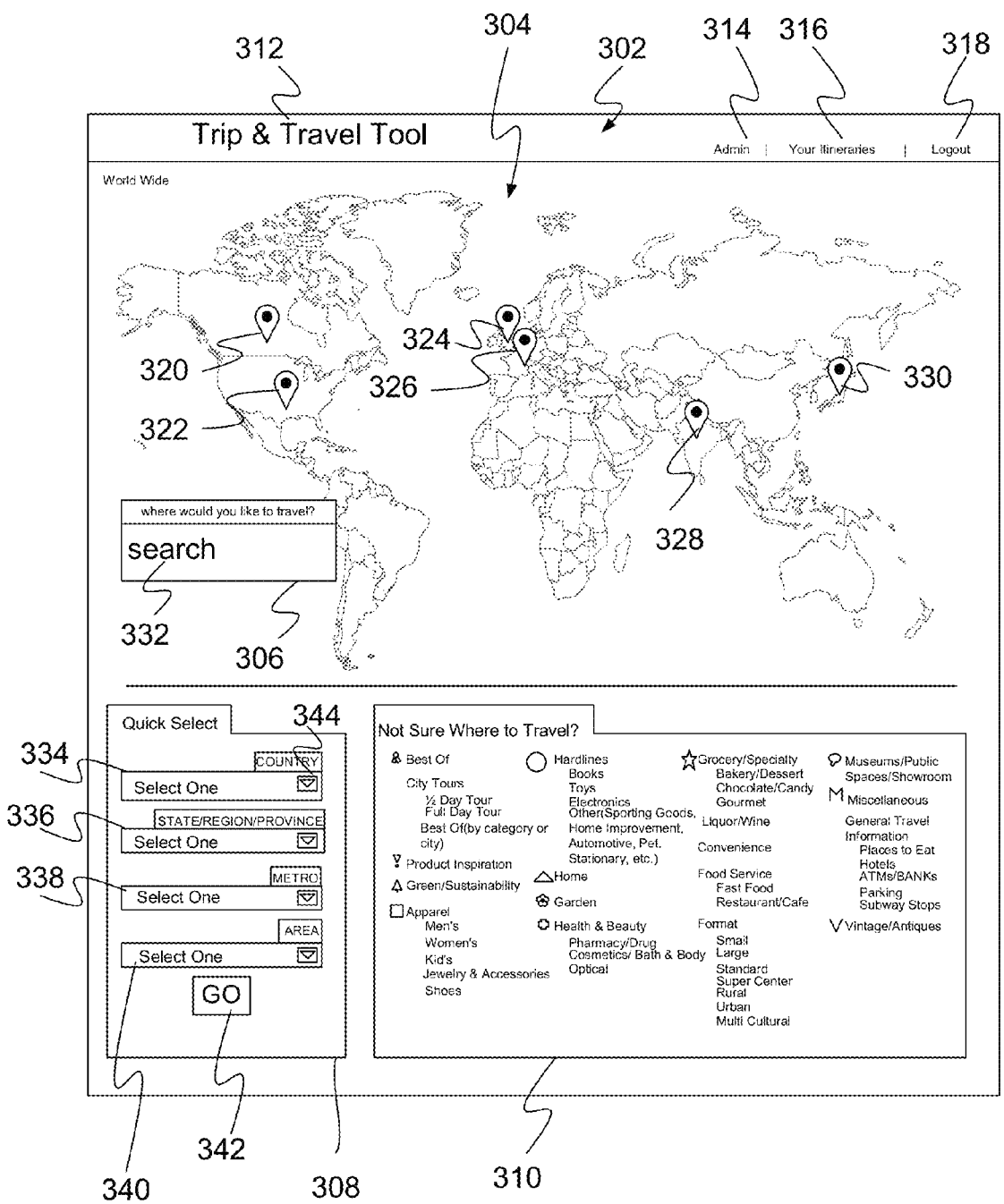
FIG. 3 is an example of a homepage.

The default page of the trip and travel tool pages 118 is the login page. Once the user is logged in, trip and travel server 120 provides a homepage 300 as shown in FIG. 3. FIG. 2 provides a flow diagram of operations associated with homepage 300.

Homepage 300 includes a header 302, a map 304, a search box 306, a quick select box 308, and a category box 310. Header 302 includes a title 312, an admin link 314, a "Your Itineraries" link 316, and a logout link 318. In some embodiments, header 302 may also include the user name of the user who is currently logged in. When homepage 300 is initially provided at step 202 of FIG. 2, map 304 is a map of the entire world. In map 304, icons 320, 322, 324, 326, 328, and 330 are displayed with a separate icon on each country in which travel locations have been defined. Search box 306 includes a text entry area 332 in which a user may enter text. Quick select box 308 includes country box 334, state box 336, metro box 338, area box 340 and a GO button 342. Each of boxes 334, 336, 338 and 340 include pull down controls such as pull down control 344 of country box 334. By activating the pull down controls, a list of values for the particular box will be displayed allowing the user to select possible values for the box. Go button 342 may be selected by the user to submit the values in country box 334, state box 336, metro box 338 and area box 340. Category box 310 includes a list of selectable categories.

If at step 204, trip and travel server 120 receives an indication that the user has selected administrator link 314, trip and travel server 120 builds and returns an administrator page at step 206. If server 120 receives an indication that the user has selected the "Your Itineraries" link 316 at step 208, trip and travel server 120 builds and returns the user's itinerary page at step 210. Steps 206 and 210 are discussed further below. If server 120 receives an indication that the user has selected at step 212 a category from the collection of categories 310, trip and travel server 120 adds flags to map 304 for the best cities that match the selected category at step 214 and returns the new flags and map to the client device. Note that the flags may take the form of icons such as icons 320, 322, 324, 326, 328 and 330 of FIG. 3.

Figure 4:
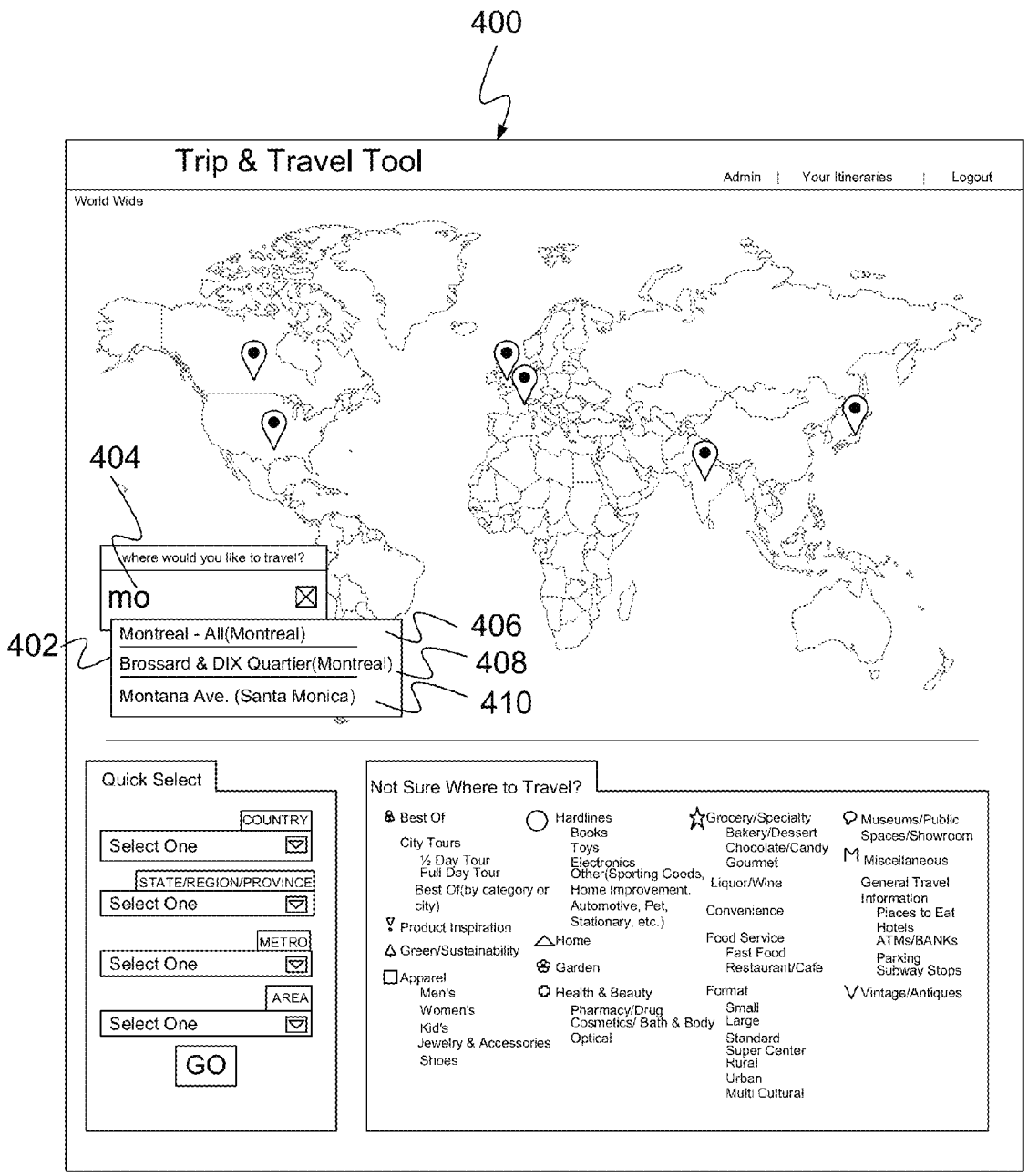
FIG. 4 is an example of a search box on a homepage.

Trip and travel server 120 may also receive a user selection of a zone at step 216. The user selects a zone at step 216 in one of three ways. The first way is for a user to type in the name of the zone in search box 332. As the user types in search box 332, a drop down list of zones that match the search terms in search box 332 is displayed. FIG. 4 provides an example of a webpage 400 showing a drop down list 402 as user types "MO" in search text box 404. Drop down list 402 includes three entries 406, 408, and 410. Using a pointing device, touch screen or arrows keys, the user may select one of the items in drop down list 402 and thereby select a zone.

An alternative means for the user to select a zone is for the user to use quick select box 308 of FIG. 3. Quick select box 308 is designed to be filled in by the user in a top/down manner such that the user first selects a country in country box 334 then moves down through state box 336, metro box 338 and area box 340. Upon selection of the country in country box 334, the drop down menu associated with state box 336 is populated with states in the selected country. After the user has selected a state, the user may select a metro area or city from the drop down menu of metro box 338, which is populated with cities that fall within the selected state. After selecting the metro area or city, the user may select an area from the drop down menu of area box 340, which is populated with areas found in the selected city or metro area.

Figure 5:
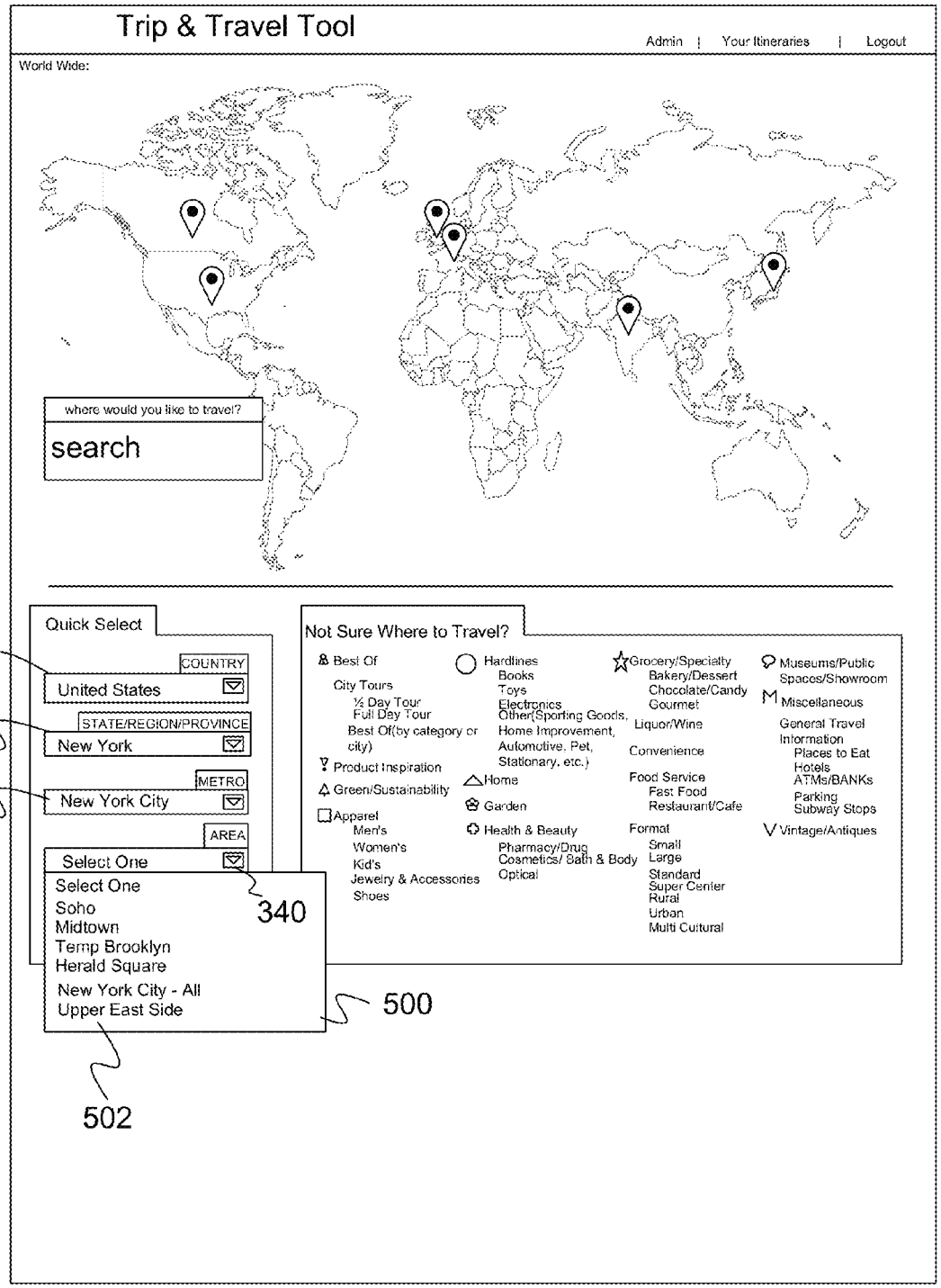
FIG. 5 is an example of a quick select on a homepage.

FIG. 5 shows an example of quick select box 308 after the user has selected the United States in country box 334, New York in state box 336, and New York City in metro box 338. For area box 340, a drop down menu 500 is displayed that includes a list 502 of areas defined for New York City by the administrator. To make the zone selection, the user presses GO button 342. The user may press GO button 342 at any stage of filling in the information in quick select box 308. Thus, the user may press GO button 342 after selecting the country in country box 334 and without selecting a state, city or area. If the user simply selects the country, pressing GO button 342 will submit the country as the selected zone. Similarly, the user may simply select a country and state without selecting a city and area or the user may select the country, state, and city without selecting an area.

A third way for the user to select a zone is to use a pointing device or touch screen to select a country, state, city or area shown on map 304.

Figure 6:
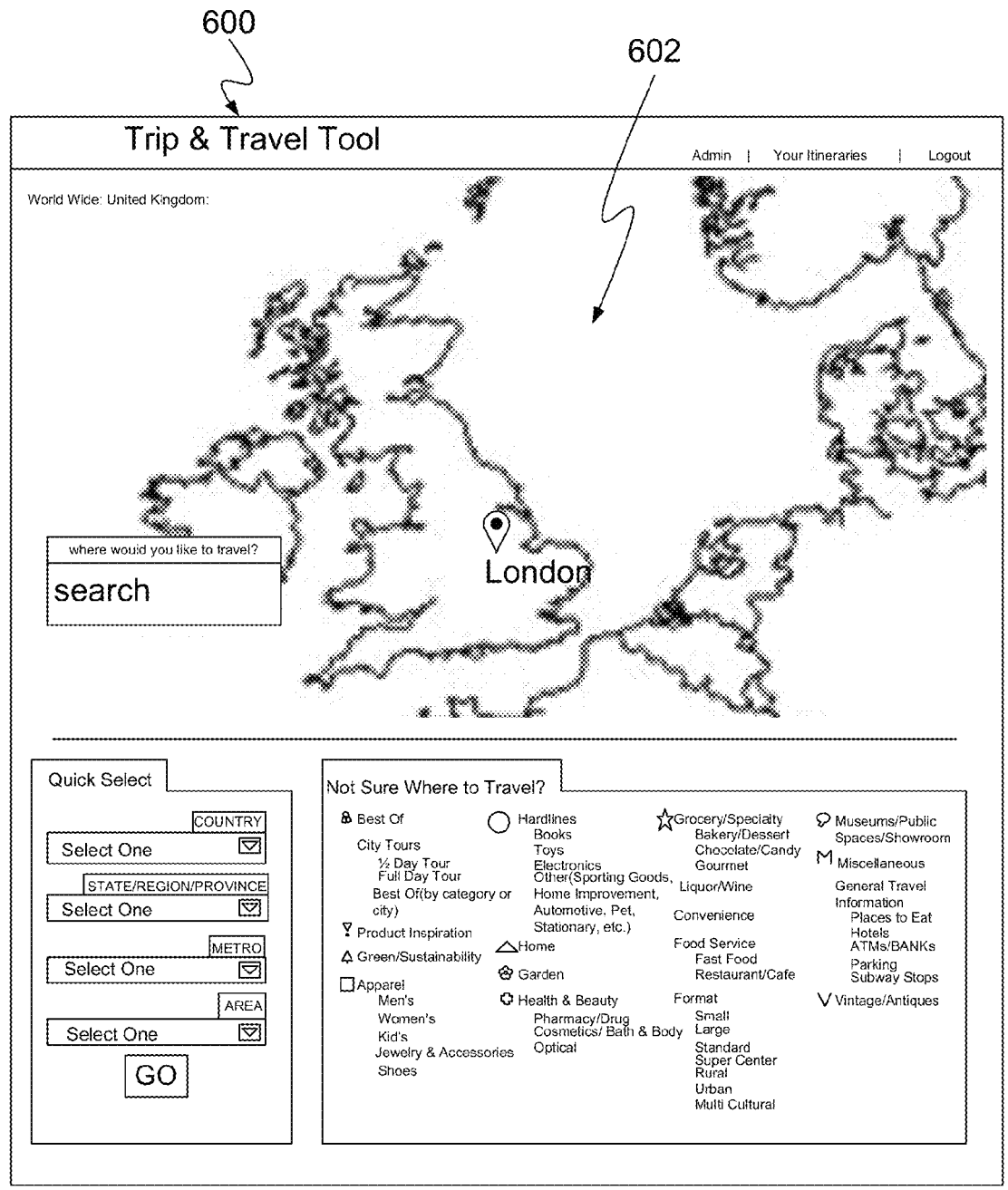
FIG. 6 is an example of zooming into a country on a home page.

At step 218, server 120 determines if the selected zone contains a single area or multiple areas, where an area is a named geographical span defined by the administrator. If there is more than one area in the selected zone at step 218, server 120 zooms in to the selected zone at step 220 by requesting a map of the selected zone using map APIs 114 of map server 112. Map server 112, in response, provides a map image 116 of the selected zone which is displayed within the homepage in place of the previous map image. FIG. 6 provides an example of a homepage 600 in which a new map 602 has been displayed, which shows the United Kingdom in response to the user selecting the United Kingdom either through search text box 306, quick select box 308, or by using a pointing device on map 304.

After server 120 zooms into the selected zone at step 220, the process returns to wait for additional input selections of administrator link 314, Your Itineraries link 316, a category of category box 308, or another zone in the currently displayed map. The user may continue to select zones at step 216 to narrow the geographic span depicted in the map of the homepage. For example, if the user selects London in FIG. 6, server 120 will zoom in to London at step 220 as shown in homepage 700 of FIG. 7. In accordance with some embodiments, a breadcrumb trail 770 indicates the level of zoom on the homepage. For instance, breadcrumb trail 770 indicates that the current map view is of the city of London, which is in the United Kingdom, which is part of the world.

Figure 7:
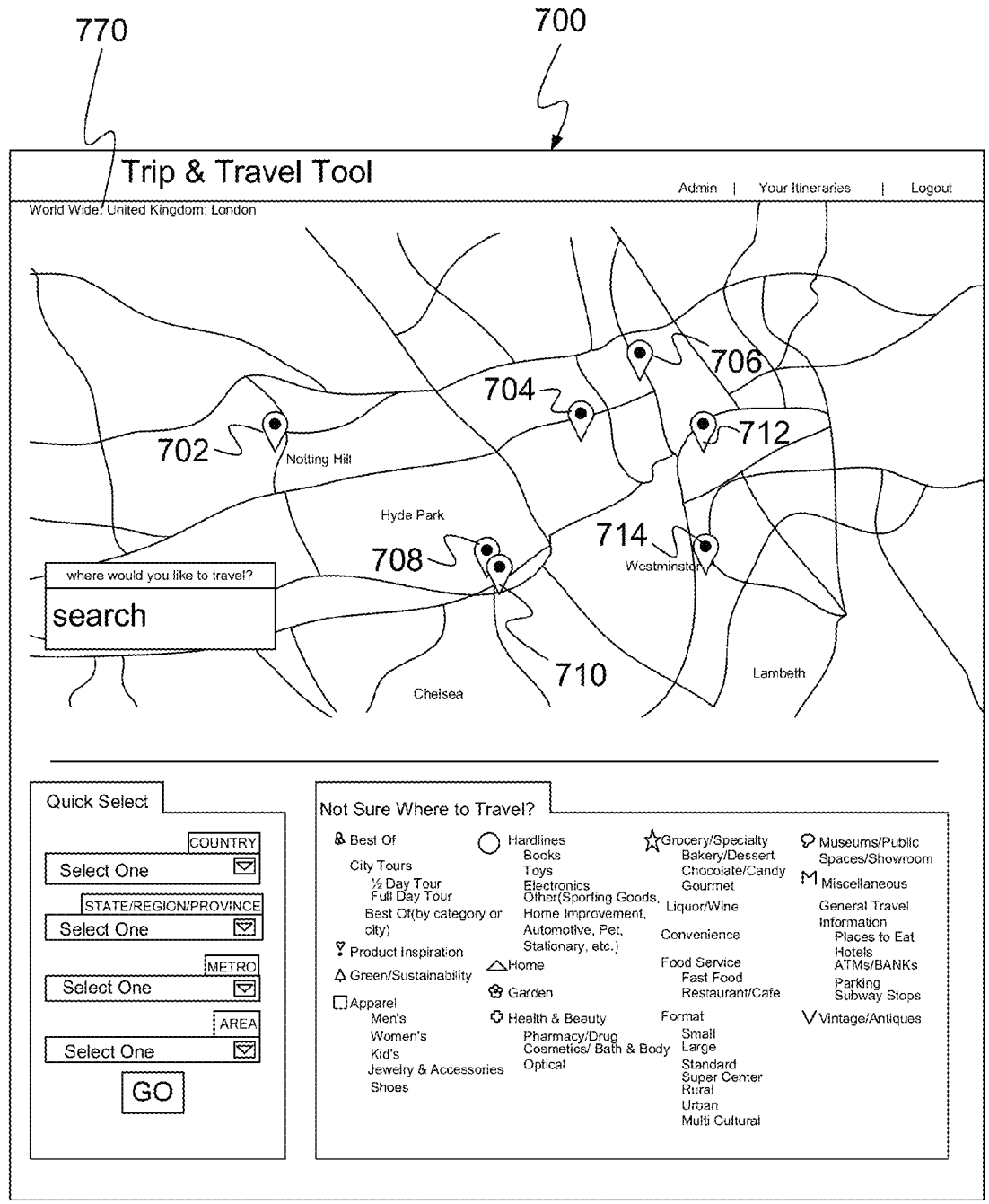
FIG. 7 is an example zooming into a city on a homepage.
Figure 8:
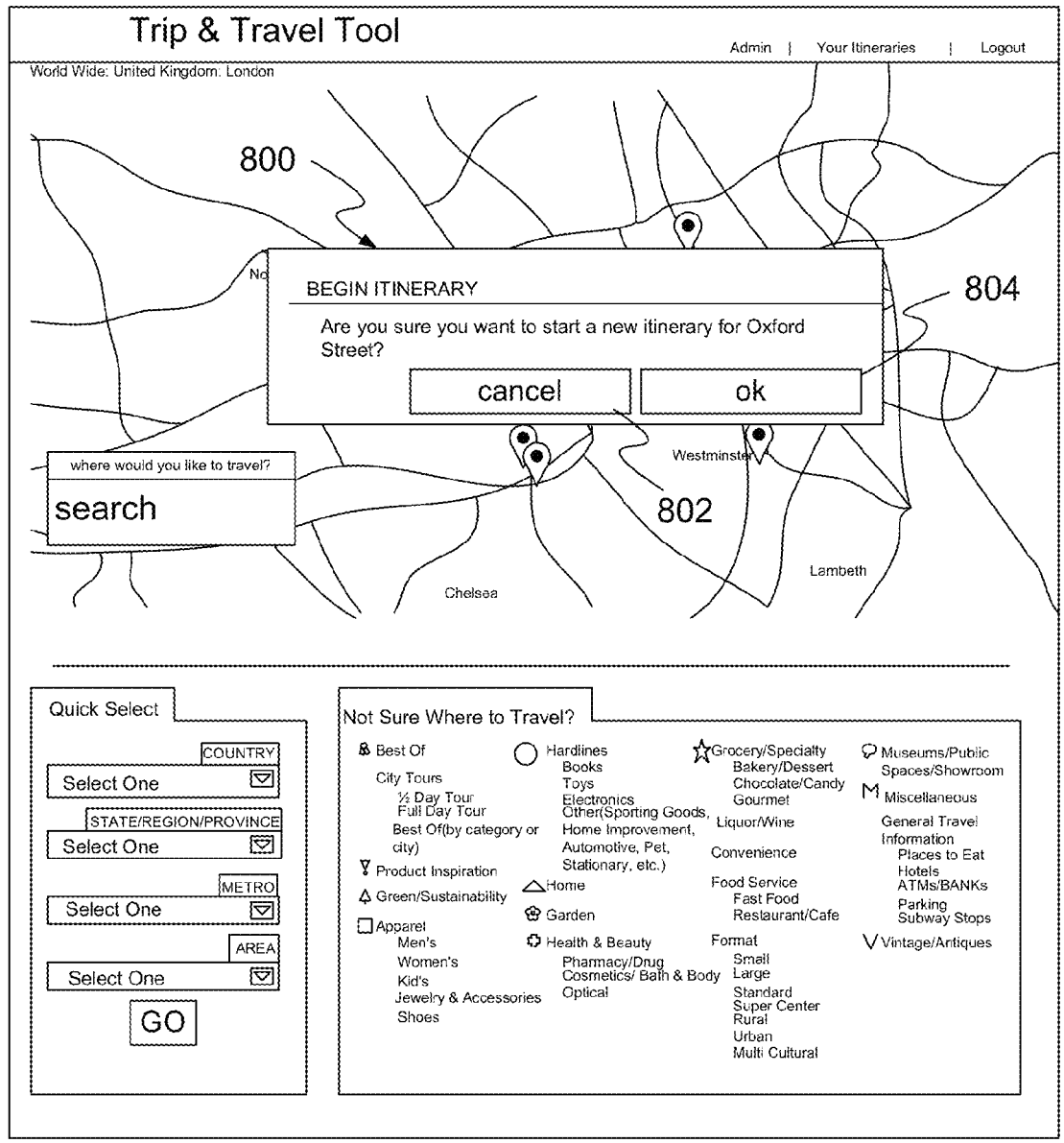
FIG. 8 is an example of a popup window to begin an itinerary.

When the selected zone represents a single area, for example selecting one of the area icons 702, 704, 706, 708, 710, 712, or 714 of FIG. 7, a pop-up is displayed at step 222 to confirm that the user wishes to begin an itinerary for the selected area. FIG. 8 provides an example of a confirmation pop-up 800 which asks the user to confirm that they wish to start a new itinerary for the selected area. If the user presses cancel button 802 of pop-up 800, the itinerary is not begun at step 224 and the process returns to wait for an additional selection by the user. If the user presses OK button 804 of pop-up 800, client 102 sends a request for an itinerary building page for the selected area that is received by server 120 at step 226. In response, server 120 creates a new itinerary in itinerary table 152 at step 228 and constructs and transmits a build itinerary page at step 230.

Figure 9:
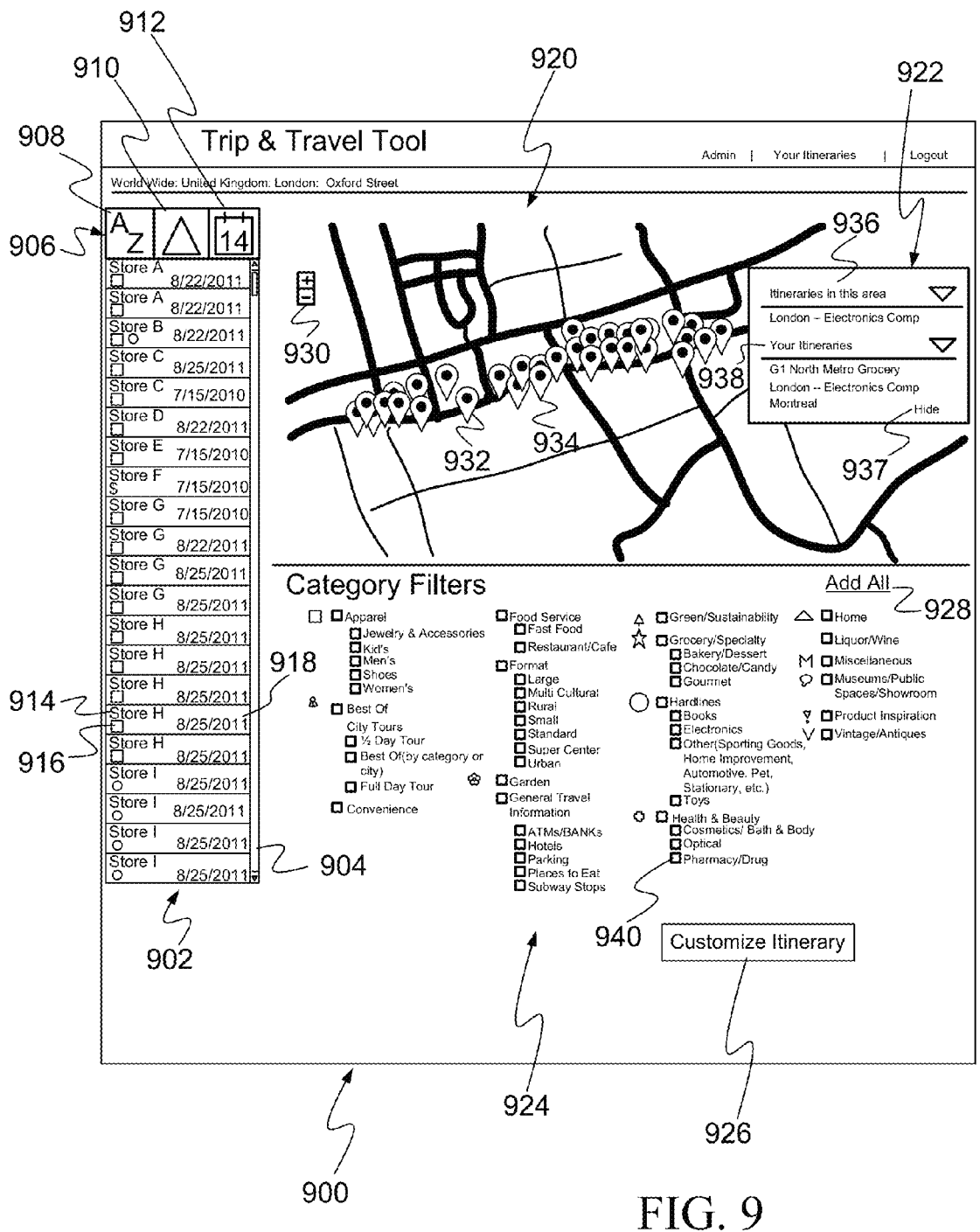
FIG. 9 is an example of a build itinerary page.

FIG. 9 provides an example of a build itinerary page 900 that is returned by server 120 in response to the request for this page at step 226. Build itinerary page 900 includes a location list 902, which lists all locations that have been defined for the selected area. List 902 includes a scroll bar 904 and a sort heading 906. Sort header 906 includes three sorting buttons: alphabet sort 908, recommend sort 910, and date sort 912. When alphabet sort button 908 is pressed, the stores in store list 902 are organized alphabetically. When recommend sort button 910 is selected, the stores that are recommended are shown at the top of list 902. When date sort button 912 is selected, the stores in list 902 are sorted based on the date that the stores were opened. Each entry in store list 902 includes a store name such as name 914, category icons such as category icon 916 that represent categories assigned to the store and date 918, which represents the date the store first opened.

Build itinerary page 900 also includes a map 920, itinerary box 922, category filter 924, customize itinerary button 926 and Add All button 928.

Map 920 provides a map of the entire selected area and includes a zoom in/zoom out control 930 and location icons such as location icons 932 and 934. The position of the location icons on map 920 corresponds to the geographic position of the locations found in location list 902.

Itinerary box 922 includes a list of Itineraries in This Area 936 and a list of "Your Itineraries" 938. Itineraries in This Area 936 includes itineraries written by the administrator for the current area. "Your itineraries" 938 includes a list of at least some of the itineraries associated with the current user, where the itineraries of the user may not be for the current area. Itinerary box 922 includes a Hide button 937 that when selected causes itinerary box 922 to be removed from the display so that more of map 920 is visible.

Category filters 924 provide a list of categories with each category having a check box next to it such as check box 940 for the category "Pharmacy/Drug". By selecting a check box next to a category, the user is able to remove all icons on map 920 that represent locations that do not fall within the selected categories. If none of the categories are marked, as is shown in FIG. 9, all of the locations have their map icons shown on map 920. However, if at least one category is checked, only those locations that fall within at least one of the selected categories have their respected map icons displayed on map 920. The operation of category filters 924 is discussed in more detail below.

Figure 10:
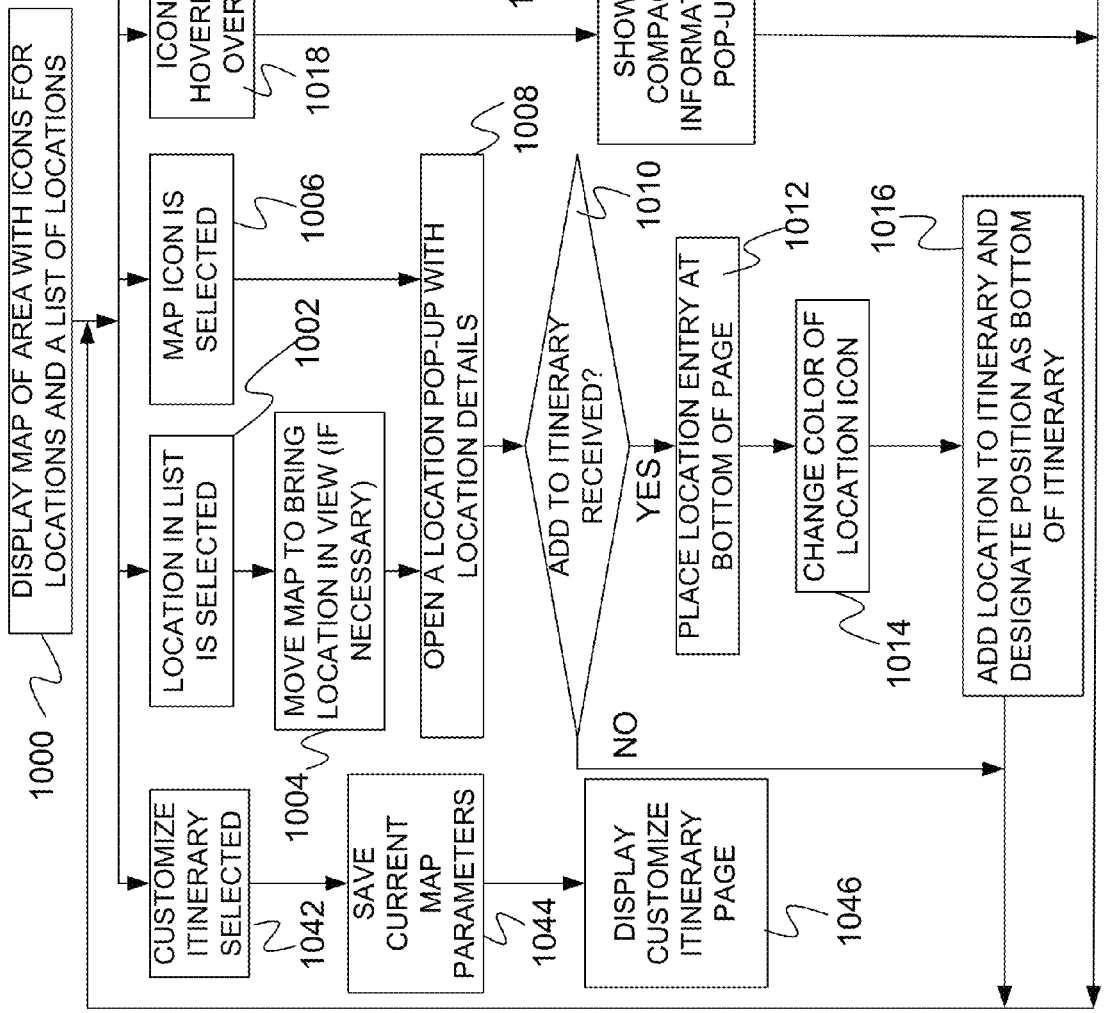
FIG. 10 is a flow diagram of operations that can be performed on a build itinerary page.

Build itinerary page 900 allows for a number of operations to be performed. FIG. 10 provides a flow diagram showing the operations that can be performed on the build itinerary page. At step 1000 of FIG. 10, the build itinerary page is displayed with a list of locations and a map of the area showing icons for locations in the list.

One of the operations that may be performed on build itinerary page 900 is the selection of a location. A location may be selected in two different manners. In step 1002, a location is selected by selecting the location from location list 902 using a pointing device. When a location is selected in this manner, map 920 is moved to bring the location into view if necessary at step 1004. To move the map, the longitude and latitude of the selected location is provided to map API 114 with a request to center the map on that longitude and latitude. In response, map server 112 returns a map that it is centered on the provided location. The returned map is then displayed in build itinerary page 900.

The alternative means for selecting a location is to select one of the map icons such as map icon 932 or map icon 934. An icon may be selected by using a pointing device or by touching a touch sensitive screen.

Figure 11:
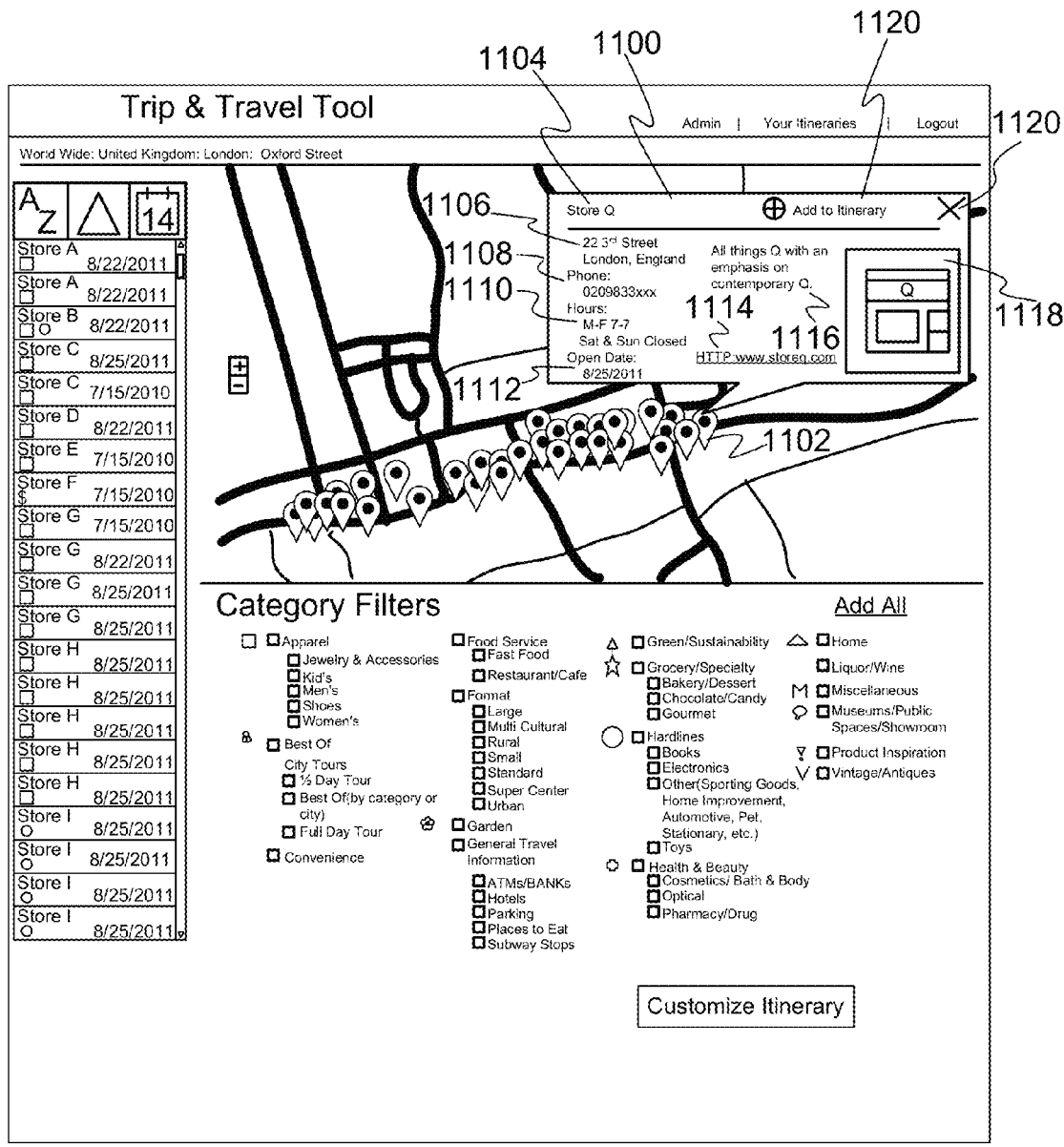
FIG. 11 is an example of a location popup on the itinerary page.

After step 1004 or 1006, a location pop-up is opened at step 1008 that contains location details for the selected location. FIG. 11 provides an example of a location pop-up 1100 on build itinerary page 900 after the selection of a location indicated by location icon 1102. Pop-up 1100 includes a name for the location 1104, an address for the location 1106, a phone number for the location 1108, hours of operation 1110, a date the location was opened 1112, a website for the location 1114, a short description of the location 1116, an image of the outside of the location 1118, an Add to Itinerary button 1120, and a Close button 1122. Close button 1122 may be activated by the user to close pop-up 1100.

Figure 12:
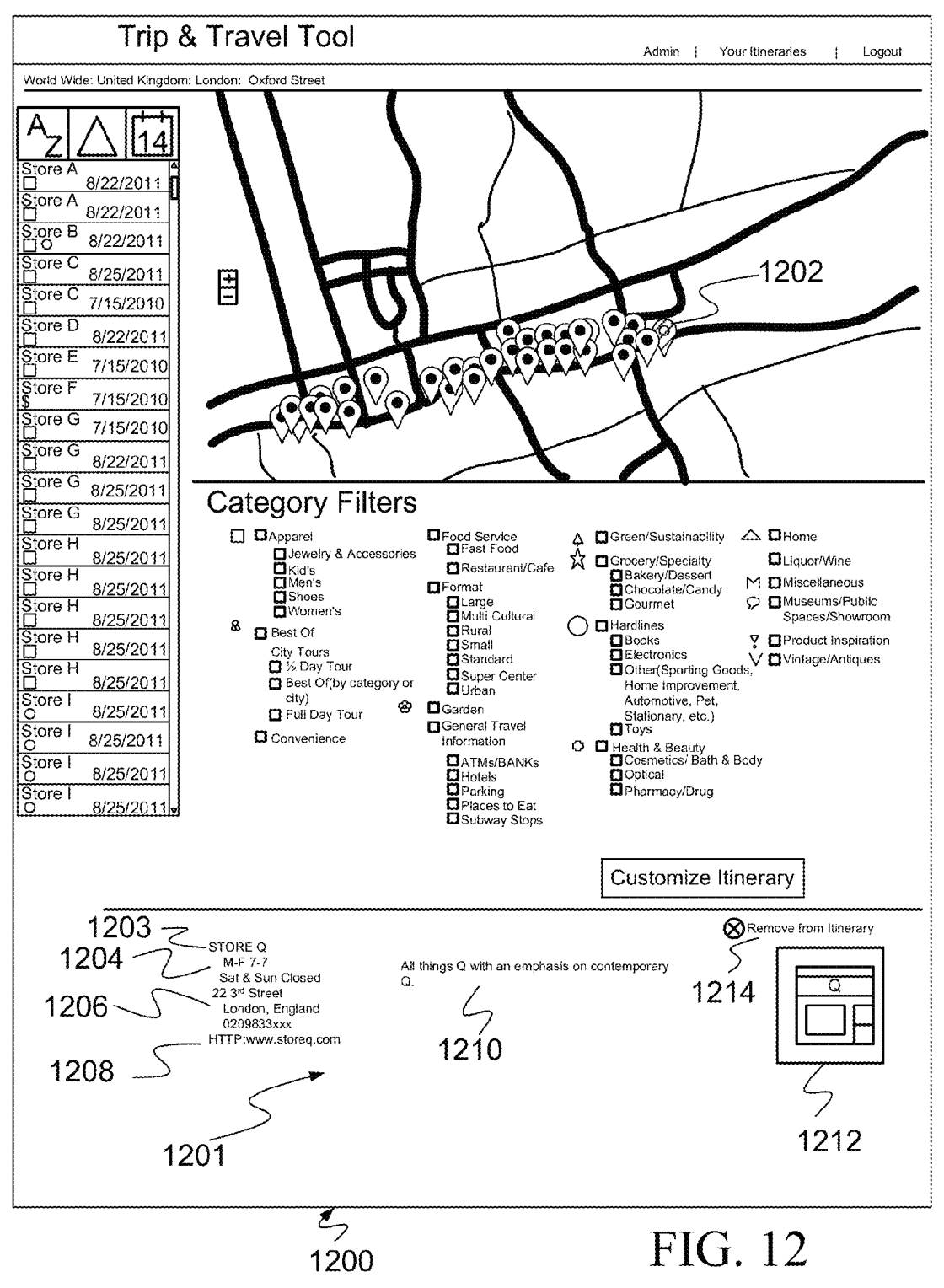

If the user selects Add to Itinerary button 1120 at step 1110, a location entry is placed at the bottom of build itinerary page 900 at step 1012 and the color of the location icon on map 900 is changed at step 1014. FIG. 12 shows an example of a build itinerary page 1200 in which an itinerary entry 1201 for a location has been added to the bottom of the page after an Add to Itinerary button has been pressed. In FIG. 12, the color of icon 1202 has been changed (represented in FIG. 12 by the cross-hatching) to indicate that the location represented by the icon has been added to the itinerary. In accordance with one embodiment, locations that have not been added to the itinerary have an icon of one color, such as red, and locations that have been added to the itinerary have an icon of a second color, such as green. Itinerary entry 1201 includes a store name 1203, hours of operation 1204, address 1206, website address 1208, description 1210, exterior image 1212, and Remove from Itinerary button 1214.

In addition to placing the location entry at the bottom of the build itinerary page and changing the color of the location icon at steps 1012 and 1014, server 120 also creates a new itinerary object in itinerary object table 154 and sets parameters in itinerary object table 154 for the new object to indicate that it is a location entry object and that it is positioned at the bottom of the itinerary at step 1016.

Figure 13:
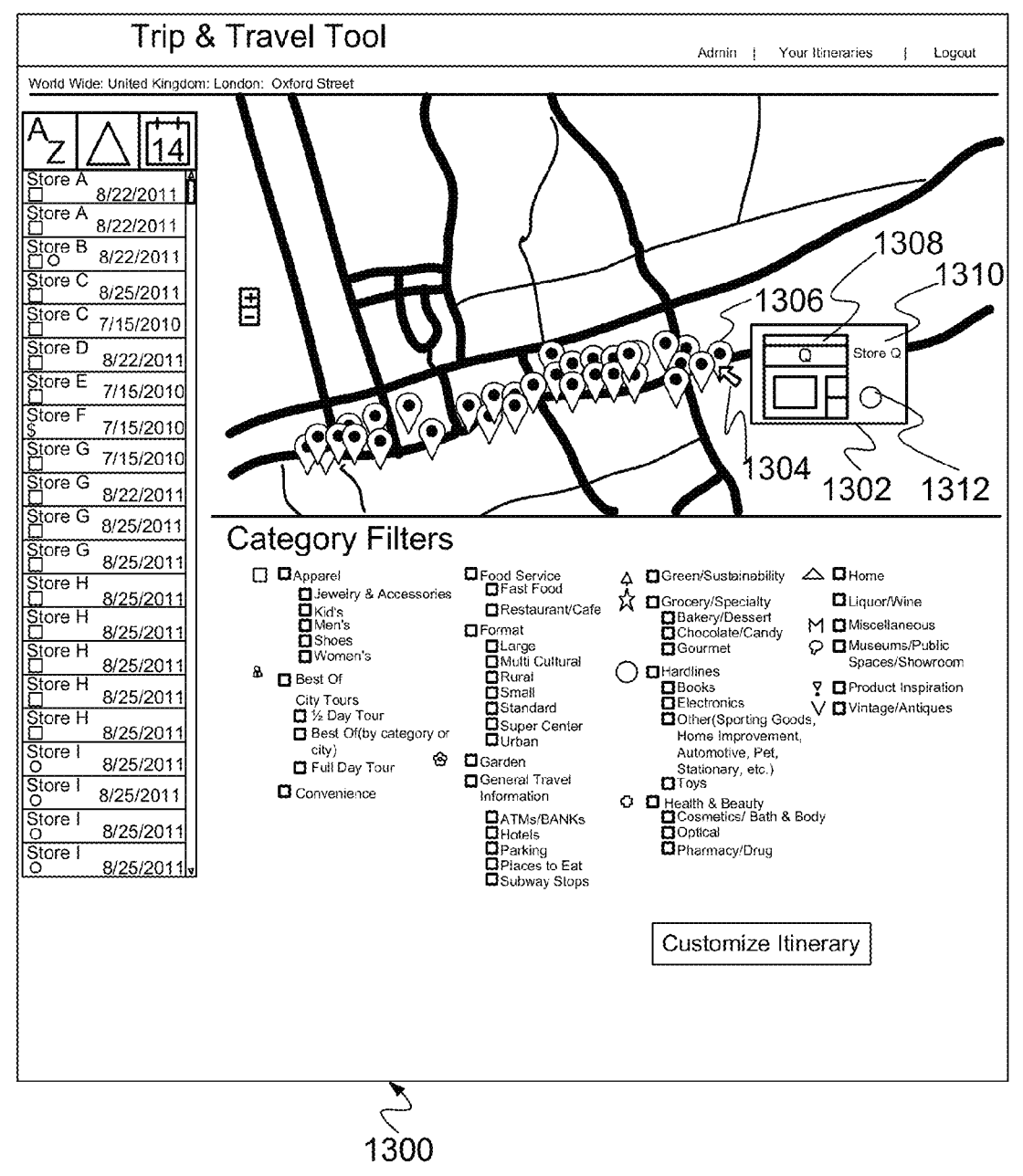

An additional operation that may be performed on build itinerary page 900 is to hover a pointer over an icon at step 1018. If an icon is hovered over at step 1018, a compact information pop-up is shown at step 1020. FIG. 13 provides an example of a build itinerary page 1300 in which a compact information pop-up 1302 is shown in response to a pointer 1304 hovering over a location icon 1306. Compact information pop-up 1302 includes exterior image 1308, store name 1310, and a category icon 1312, which represent categories assigned to the store. Compact information pop-up 1302 is removed from the display when pointer 1304 is no longer positioned over location icon 1306.

A further operation that may be performed on build itinerary page 900 is the selection of a category from the category filters. At step 1022 of FIG. 10, one or more categories are selected and at step 1024, icons of locations that do not match the selected categories are removed from the map.

Figure 14:
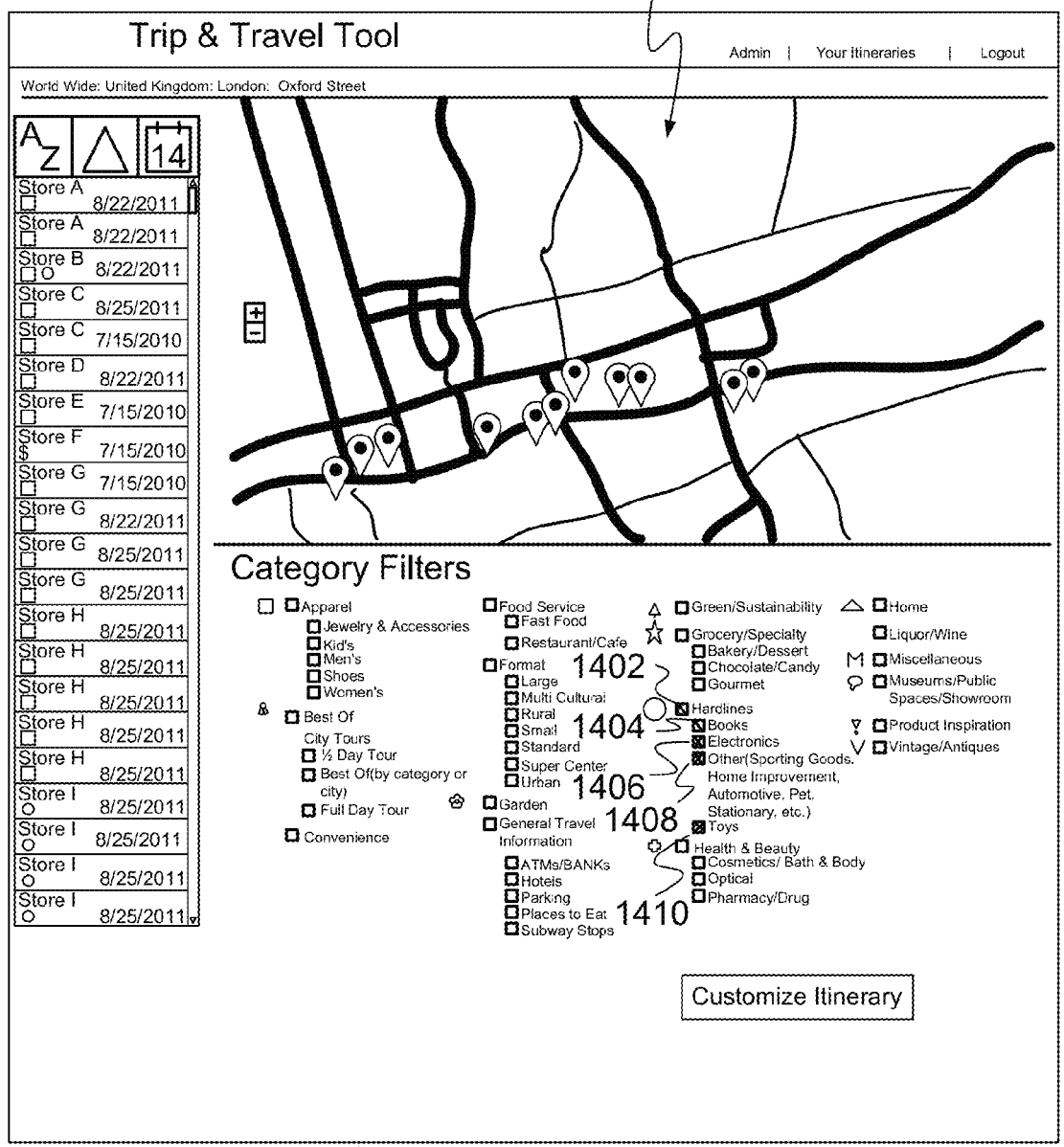
FIG. 14 is an example of a build itinerary page showing icons removed upon the selection of a category.

FIG. 14 provides an example of a build itinerary page 1400 after category filters have been selected. As shown in FIG. 14, hard lines category 1402 has been selected causing the automatic selection of all sub-categories underneath hard lines category 1402 including books category 1404, electronics category 1406, other category 1408, and toys category 1410. Map 1412 is shown to include fewer location icons than map 920 and map 1412 only shows map icons that are associated with the hard lines category.

A further operation that may be performed on the build itinerary page is the selection of the Add All button 928 at step 1026 of FIG. 10. In response to receiving an indication that the Add All button has been selected, server 120 determines which locations in location list 902 have not already been added to the itinerary and places entries for those locations at the bottom of the build itinerary page at step 1028. At step 1030, all location icons for locations added at step 1028 have their colors changed to a same second color by server 120. At step 1032, server 120 adds an itinerary object to itinerary object table 154 for each location that is added at step 1028. The parameters of the added itinerary objects are set to indicate the position of the location entries within the itinerary.

Figure 15:
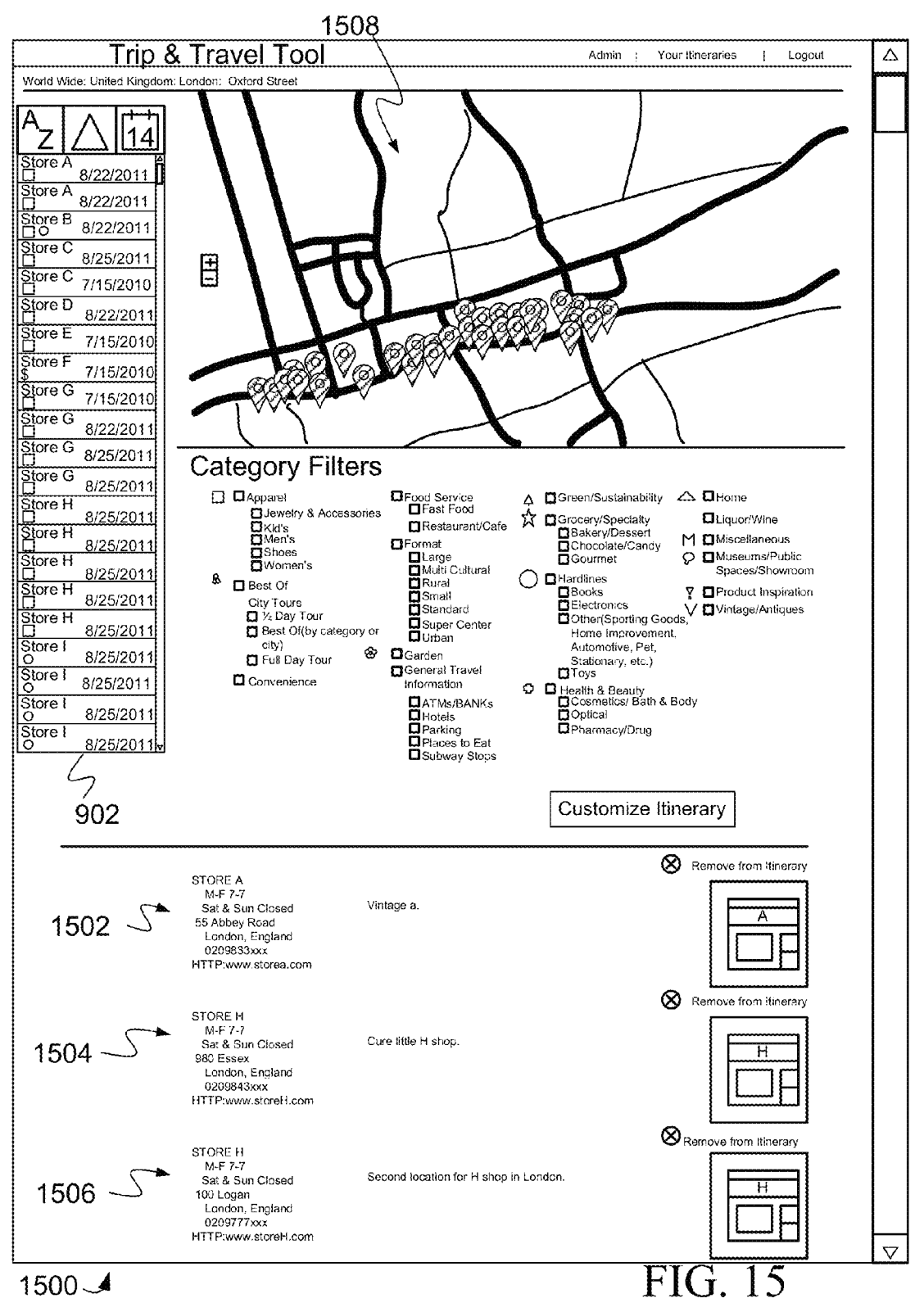

FIG. 15 shows an example of a build itinerary page 1500 after an Add All button has been selected. In FIG. 15, a separate entry has been added for each location in location list 902 although only three such entries are shown in FIG. 15 because of space limitations. In particular, entries 1502, 1504, and 1506 are shown. Each entry includes a location name, hours of operation, address, website address, description, exterior image, and a Remove from Itinerary button. In addition, in FIG. 15, each of the map icons has changed color in map 1508 as indicated by the cross-hatching on the icons.

An additional operation that may be performed on the build itinerary page is the selection of Customize Itinerary button 926. In FIG. 10, when the Customized Itinerary button is selected at step 1042, the current map parameters are stored at step 1044 by server 120. The map parameters define the current geographical span of the map view. At step 1046, the customize itinerary page is displayed.

Figure 16:
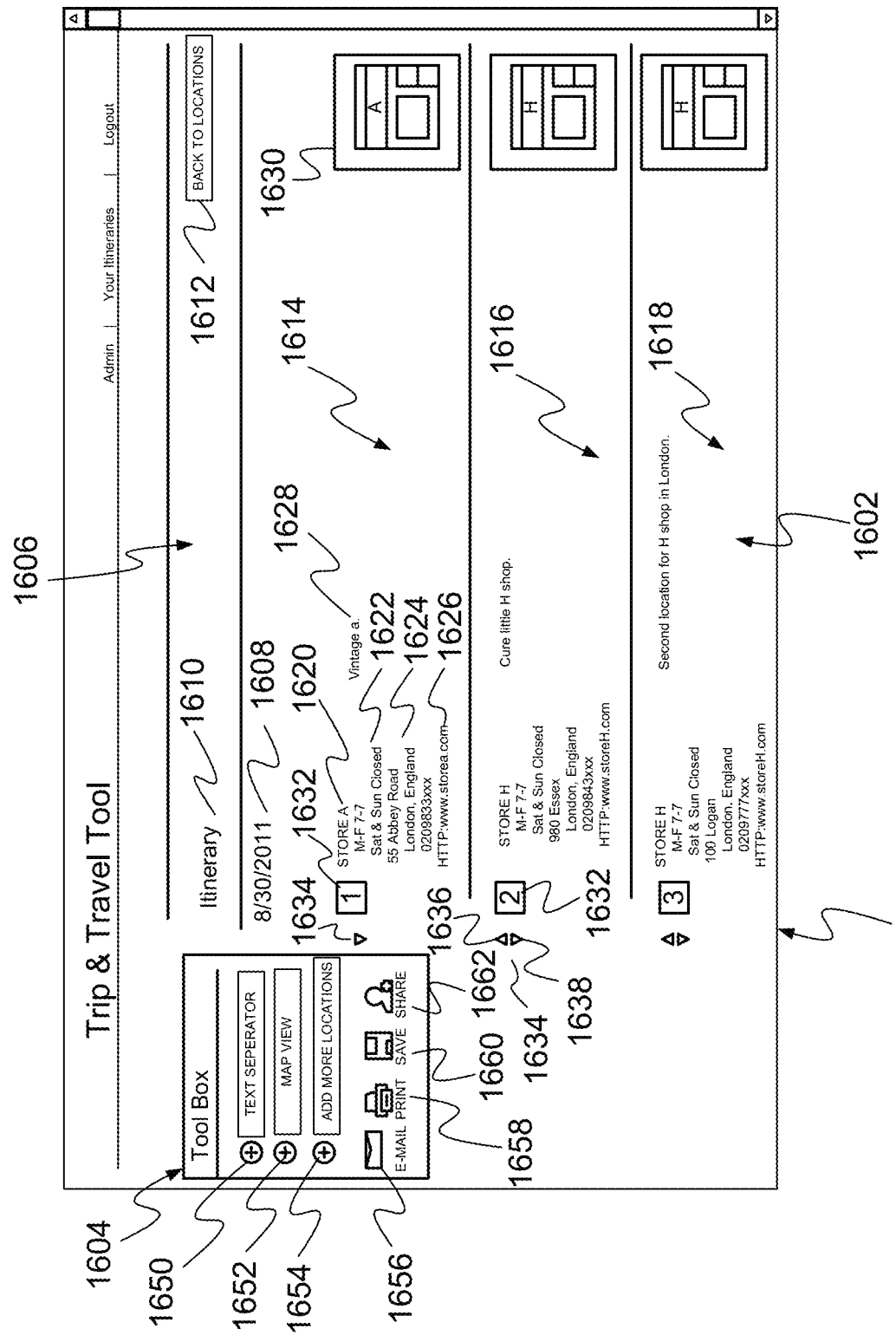
FIG. 16 is an example of a customized itinerary page.

FIG. 16 provides an example of a customize itinerary page 1600. Customize itinerary page 1600 includes an ordered itinerary list 1602, a tool box 1604, and a header 1606. Header 1606 includes a creation date 1608 for the current itinerary, an itinerary name 1610 which defaults to simply "itinerary" if the itinerary has not been saved with a name yet, and a Back to Locations button 1612 which returns the user to the build itinerary page discussed above in connection with FIG. 9.

Ordered itinerary list 1602 includes an ordered list of itinerary elements or objects that can include location entries, map elements and text separator elements, for example. When first visiting a customize itinerary page for an itinerary, the ordered itinerary list will only include location entries, with one location entry for each location that was added on the build itinerary page. In FIG. 16, ordered itinerary list 1602 includes location entries 1614, 1616 and 1618. Each location entry includes a location name 1620, hours of operation 1622, address 1624, website address 1626, brief description 1628, exterior image 1630, visit number 1632 and order control 1634. Visit number 1632 represents the relative ordinal position of when the location will be visited during the trip. In addition, the location entries are ordered in a top-down fashion based on when the locations will be visited during the trip. Since location entry 1614 is at the top of ordered list 1602, the location for entry 1614 will be the first location visited during the trip. This is confirmed by the number 1 in visit number 1632 of entry 1614. Moving down, the location associated with location entry 1616 will be the next location visited during the trip as indicated by the number 2 in visit number 1632 of entry 1616.

Order control 1634 allows the person constructing the itinerary to change the order of location entries in the itinerary and thus change the order that locations will be visited during the trip. Order control 1634 includes one or more arrows including an up arrow and a down arrow such as up arrow 1636 and down arrow 1638 of entry 1616. Using an up arrow of an order control moves the associated location entry one position upward in the itinerary. Using the downward order control 1638 moves the associated location entry downward one position in the itinerary. For example, if downward control 1638 is used in FIG. 16, entry 1616 and 1618 switch places in the itinerary. Movement of elements/objects within an itinerary is discussed below.

Tool box 1604 includes add text separator button 1650, add map view button 1652, add more locations button 1654, e-mail itinerary button 1656, print itinerary button 1658, save itinerary button 1660, and share itinerary button 1662.

Figure 17:
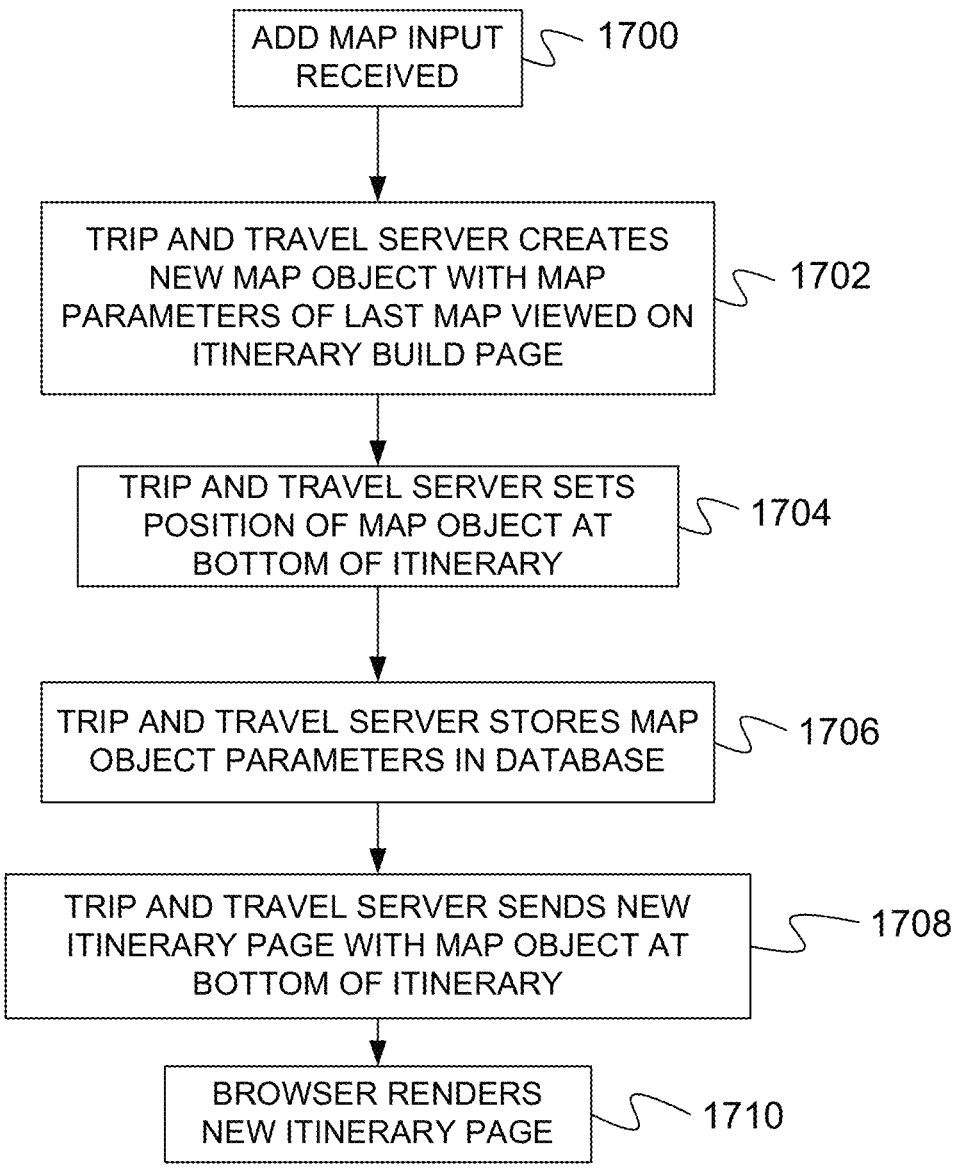
FIG. 17 is a flow diagram of a method for adding a map to a customized itinerary page.

If the user selects add map view button 1652, a map element is added to the itinerary using a method discussed in the flow diagram of FIG. 17.

In step 1700, the add map view input is received. At step 1702, trip and travel server 120 creates a new map object with map parameters of the last map viewed on the build itinerary page. Thus, the zoom level and center point of the map last viewed on the build itinerary page is used to set the zoom level and center view point of the newly created map object. At step 1704, trip and travel server 120 sets the position of the map object at the bottom of the itinerary. At step 1706, trip and travel tool server 120 stores the map object parameters in the database 130. In particular, it adds the map object parameters to itinerary object table 154. At step 1708, trip and travel server 120 sends a new itinerary page based on the itinerary objects stored in itinerary object table 154 for the current itinerary. This new page includes parameters that describe the map object and that indicate that the map object is positioned at the bottom of the itinerary. At step 1710, a browser on client device 102 renders the new itinerary page 1710 by requesting a map image 116 using map APIs 114 on map server 112. The request is made based on the map parameters provided for the map object. Map server 112 then returns the requested map image.

Figure 18:
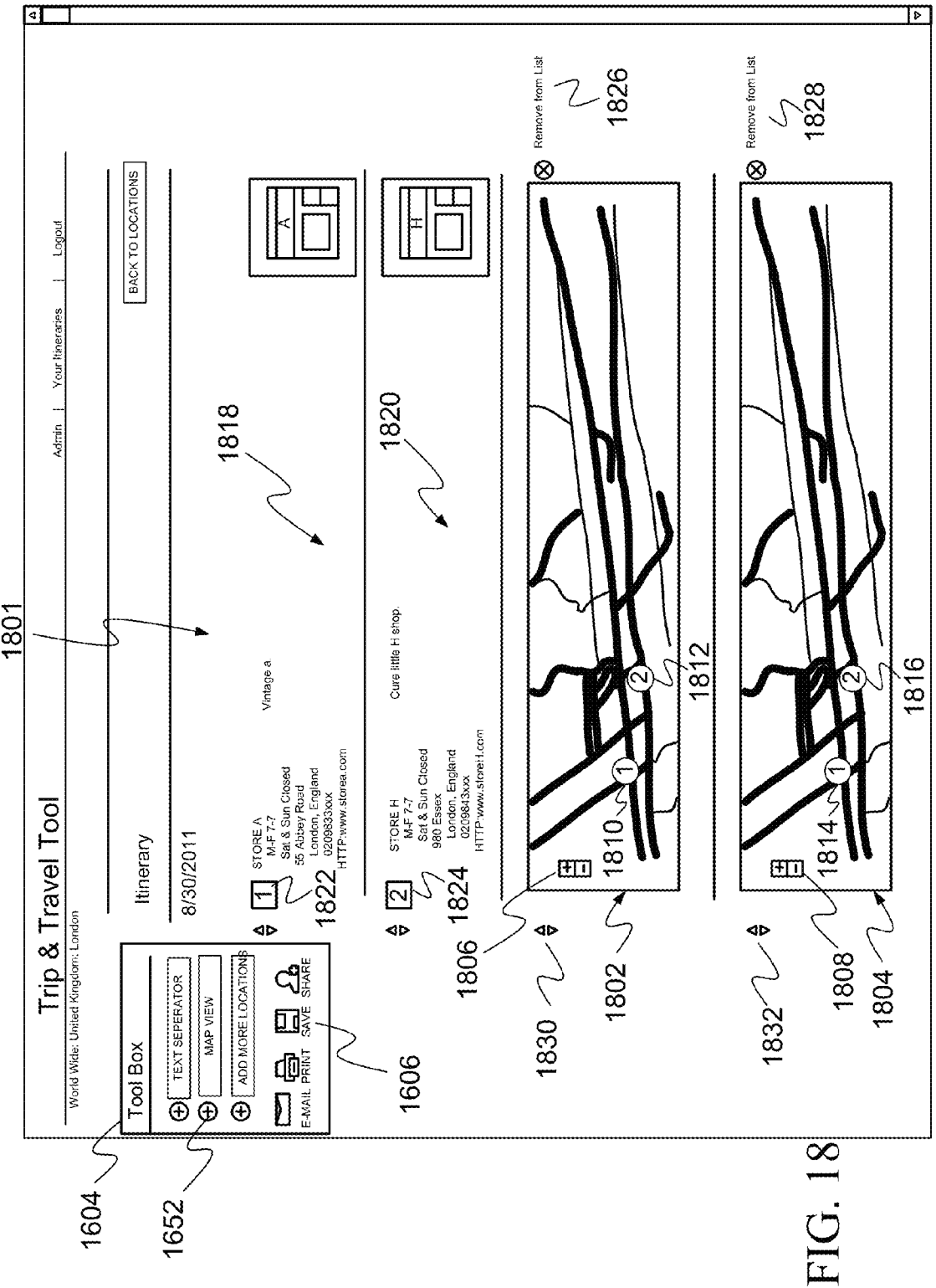
FIG. 18 is an example of a new map added to a customized itinerary page.

FIG. 18 provides an example of a customize itinerary page 1800 in which two map objects have been inserted into the ordered itinerary list 1801 by selecting add map view button 1652 twice. The two map objects 1802 and 1804 include respective zoom controls 1806 and 1808 as well as respective location icons 1810, 1812 and 1814, 1816. Location icons 1810 and 1814 represent the location of the store found in location entry 1818 and location icons 1812 and 1816 represent the store found in location entry 1820. The number in location icons 1810 and 1814 corresponds to the number in visit number 1822 of location entry 1818 and the number in location icons 1812 and 1816 corresponds to the number in visit number 1824 of location entry 1820. Map objects 1802 and 1804 also include respective Remove from List buttons 1826 and 1828 and respective order controls 1830 and 1832. Remove from List buttons 1826 and 1828, cause the associated map object to be removed from ordered itinerary list 1801. Order controls 1830 and 1832 move their corresponding map objects upward or downward in ordered itinerary list 1801 in a similar manner to the operation of order control 1634 of FIG. 16.

Figure 19:
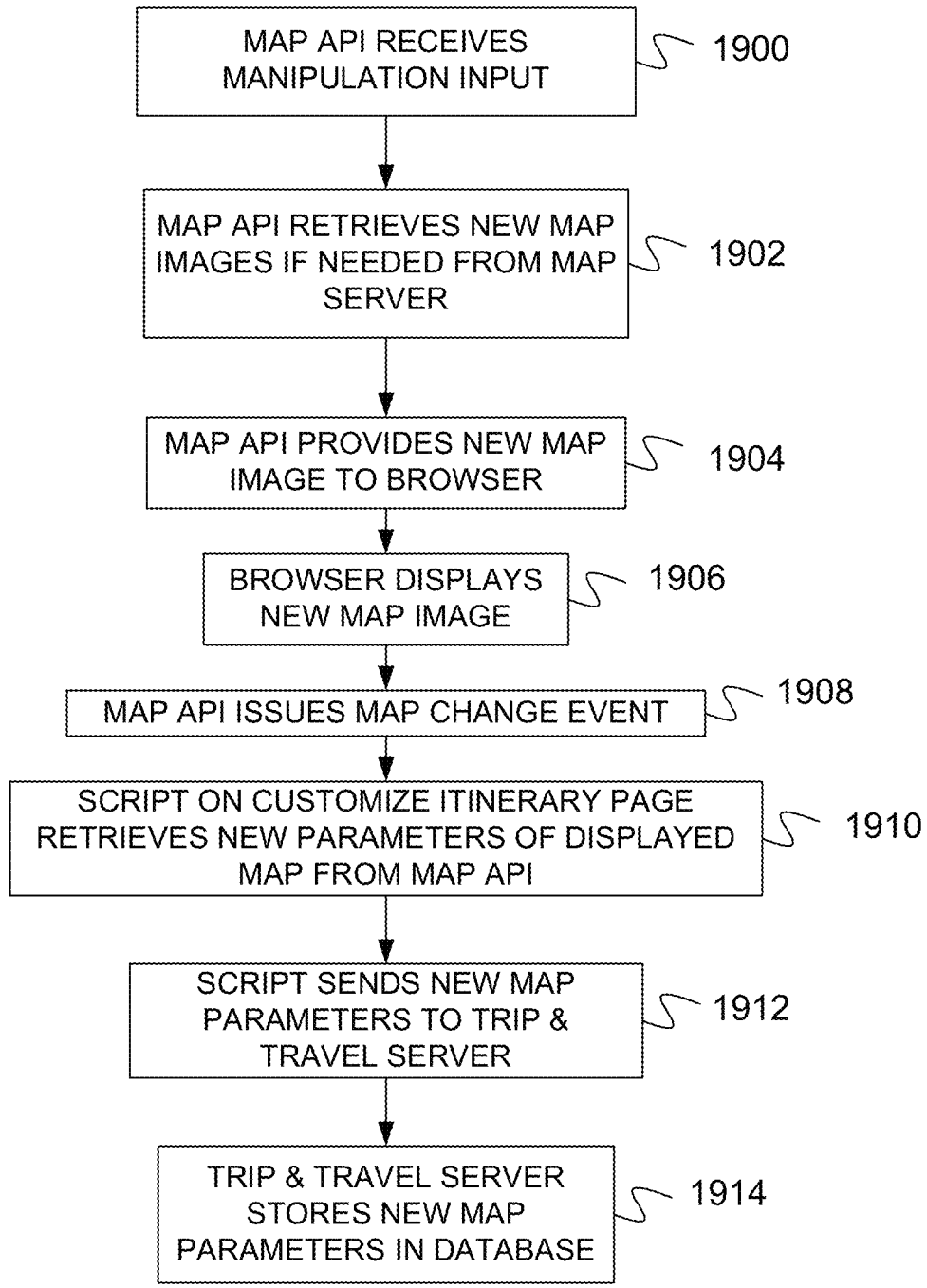
FIG. 19 is a flow diagram of a method for manipulating a map on the customized itinerary page.

Each map object 1802 and 1804 is independent of the other map, such that the user may zoom in or out of each map without affecting the other maps in the ordered itinerary list. Further, the user may geometrically translate or shift each map to show different parts of the map. FIG. 19 provides a flow diagram of a method of manipulating a map shown in ordered itinerary list 1801.

At step 1900 of FIG. 19, map API 114 on map server 112 receives map manipulation input from client device 102 based on user input. In particular, a user interaction with the zoom controls 1806 or 1808 or a translation input, typically obtained by placing a pointer on the map and dragging across the map, is received by map API 114.

Based on the input it receives, map API 114 retrieves new map images 116, if needed, from map server 112 at step 1902. Map API 114 then provides the new map image to the browser on client device 102 at step 1904. The browser on the client device 102 then displays the new map image in place of the old map image at step 1906.

At step 1908, map API 114 issues a map change event. At step 1910, a script on the customize itinerary page retrieves new parameters of the displayed map from map API 114 in response to the map change event. At step 1912, the script sends the new map parameters to trip and travel server 120 and at step 1914, trip and travel server 120 stores the new map parameters in the itinerary object table 154 of database 130, thereby saving the change in the map object. By saving the parameters of the map object as they are changed, trip and travel server automatically saves the state of the current itinerary so that the changes to the itinerary will not be lost if the user leaves the current itinerary without saving the changes using save button 1660.

Figure 20:
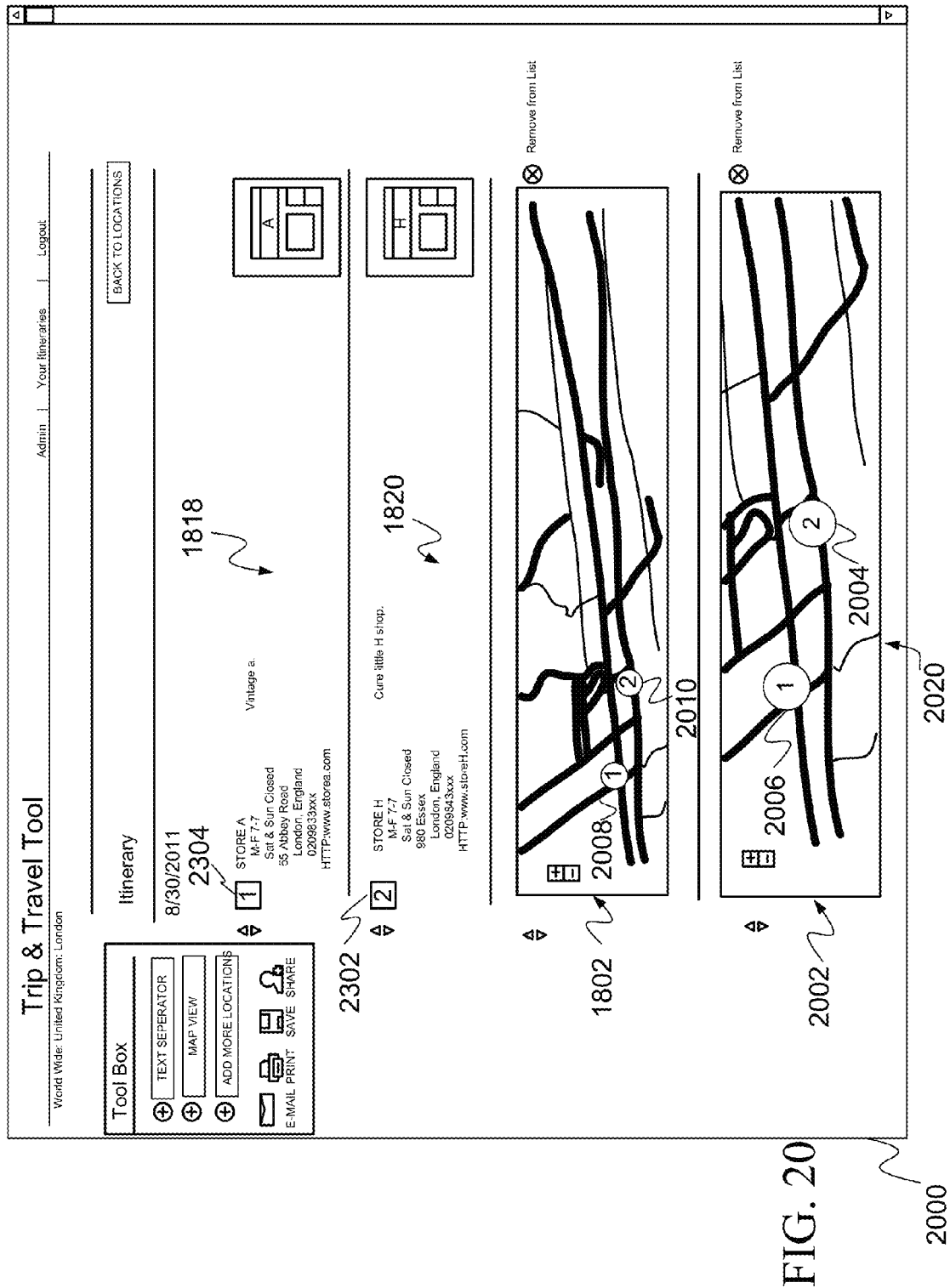
FIG. 20 shows the results of manipulating a page on a customized itinerary page.

FIG. 20 provides an example of a customize itinerary page 2000 after map object 1804 has been manipulated by a user to create map object 2002. Customize itinerary page 2000 includes an ordered list 2020 comprising location entries 1818 and 1820 having respective visit numbers 2304 and 2302 and map objects 1802 and 2002 having respective location icons 2008, 2010 and 2004, 2006. In FIG. 20, map object 2002 represents map object 1804 of FIG. 18 after a zoom-in procedure has been performed and after translating the map to place location icon 2004 toward the center of map object 2002.

Figure 21:
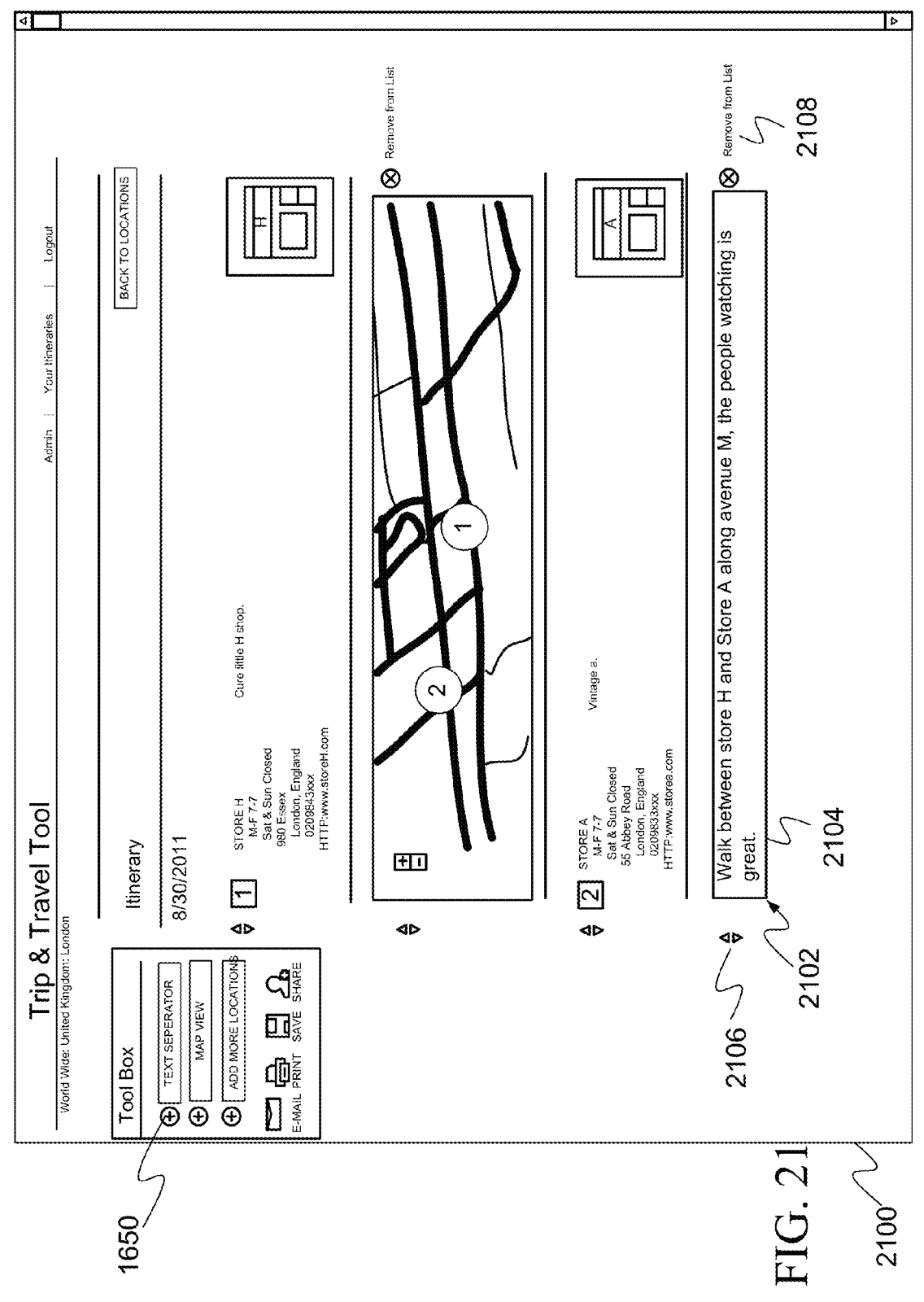

FIG. 21 provides an example of a customize itinerary page 2100 after add text separator button 1650 has been selected by a user. In FIG. 21, a text separator element 2102 has been added that includes a text box 2104, an order control 2106 and a Remove from List button 2108. If a user activates Remove from List button 2108, text separator element 2102 is removed from the itinerary. Order control button 2106 operates in a similar manner to other order control buttons discussed above for the customize itinerary page and allows the text separator element to be moved up or down in the ordered itinerary list. Text box 2104 may be selected by the user and once selected will accept text entered by the user.

Figure 22:
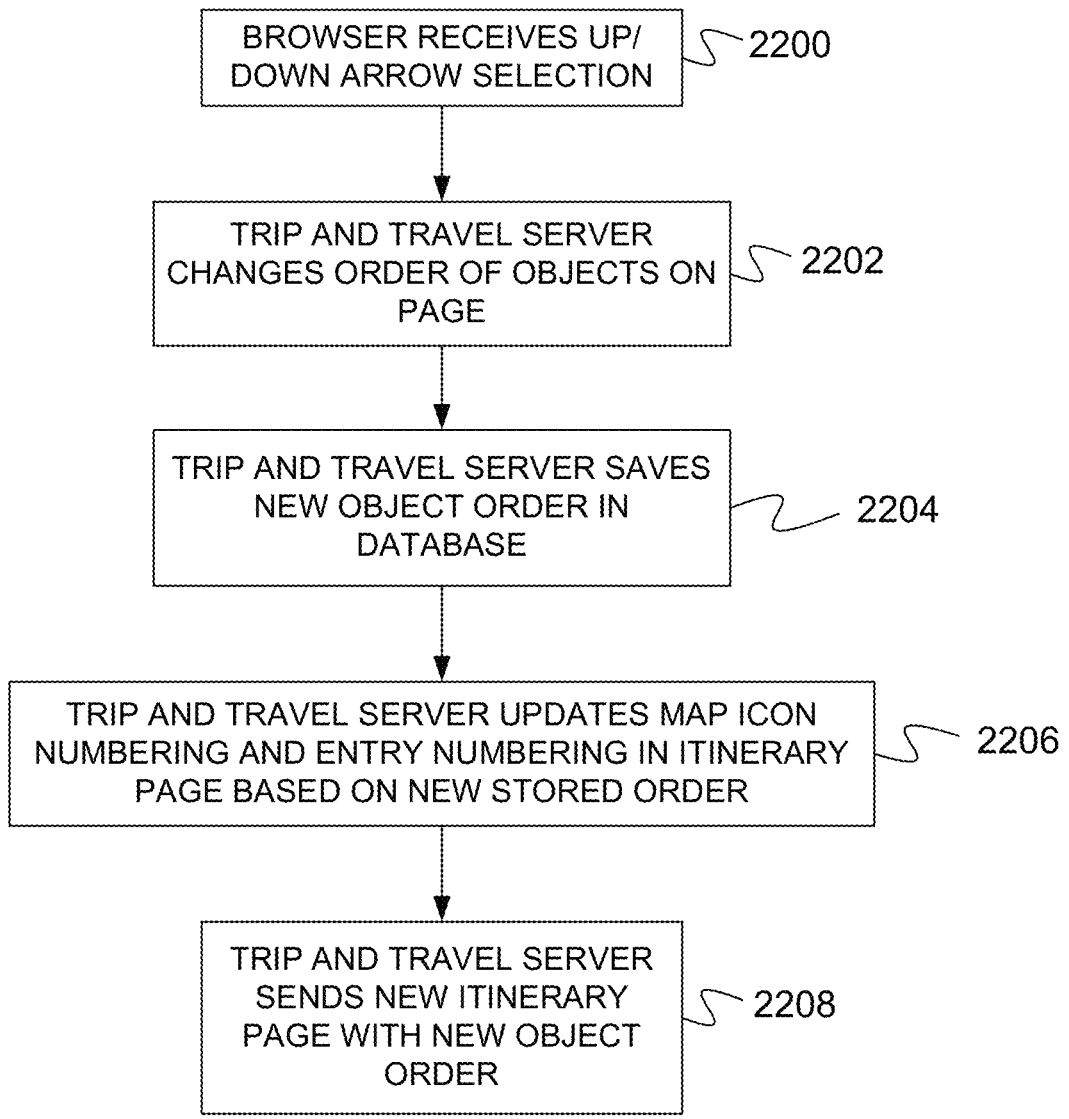
FIG. 22 provides a flow diagram of a method for selecting up/down icons on the customized itinerary page.

FIG. 22 provides a flow diagram of a method performed upon receiving an up or down arrow selection of an order control such as order control 2106 of FIG. 21, order controls 1830 and 1832 of FIG. 18 and order control 1634 of FIG. 16. In step 2200, a browser operating on client device 102 receives the selection of an up or down arrow in an order control. Based on this input, trip and travel server 120 changes the order of objects on the customized itinerary page at step 2202 by changing the parameters of the objects. At step 2204, trip and travel server 120 saves the new object order in database 130 by storing the new position value parameters for the objects in itinerary object table 154. At step 2206, trip and travel server 120 updates the map icon numbers and visit numbers in the customize itinerary page based on the new stored order. At step 2208, trip and travel server 120 sends a new customize itinerary page with the new object order and new numbering.

Figure 23:
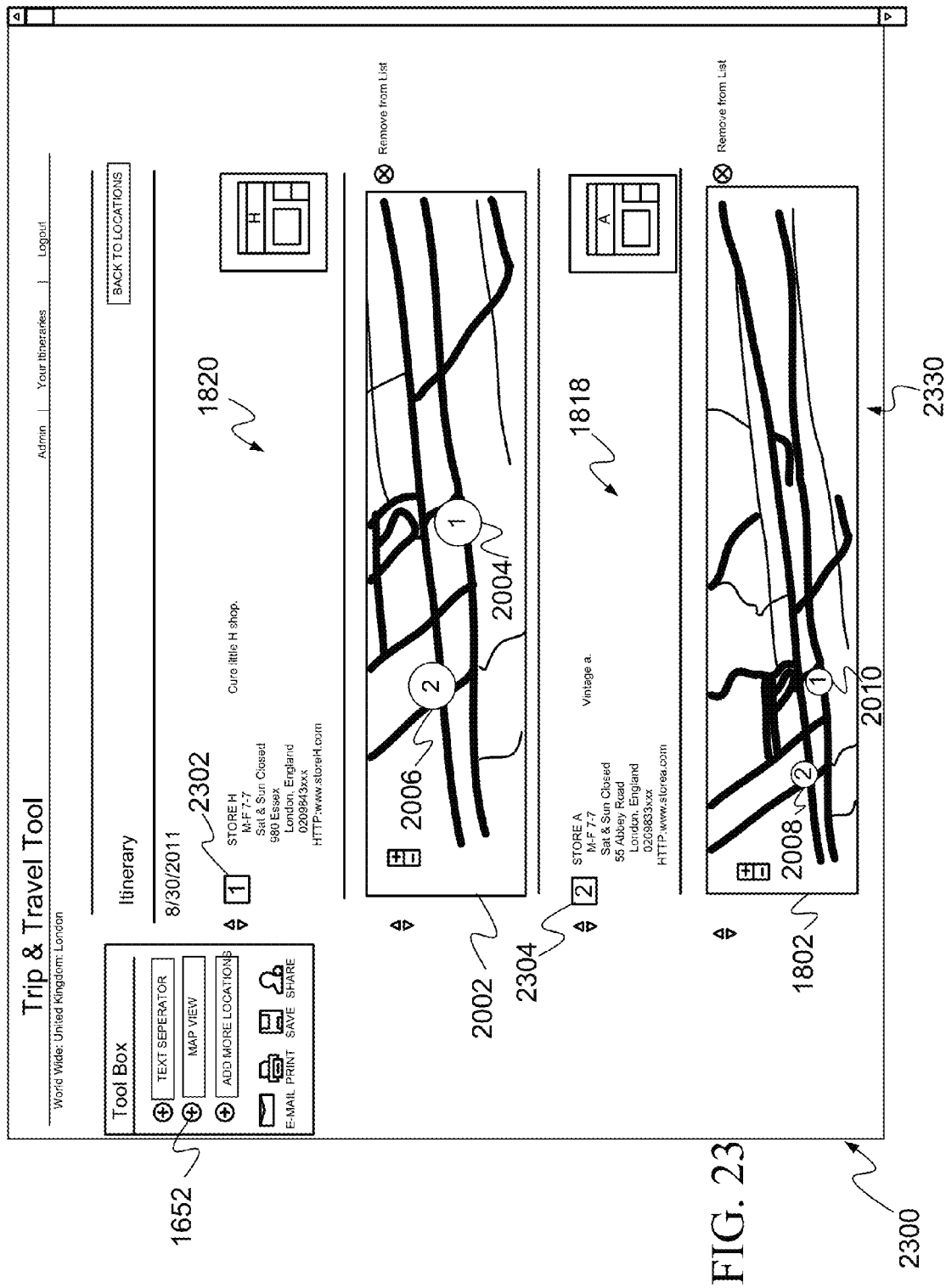
FIG. 23 shows the results of a customized itinerary page after the order of items on the itinerary page has been changed.

FIG. 23 shows an example of a customize itinerary page 2300 after itinerary objects have been shifted using the order controls associated with each object. In particular, location entry 1818 has been moved down two positions, location entry 1820 has been moved up one position, map object 1802 has been moved down one position and map object 2002 has been moved up two positions. In comparing FIG. 20 to FIG. 23, it can be seen that location entries 1818 and 1820 have been placed in a different order in FIG. 23 than in FIG. 20. As a result, visit number 2302 of entry 1820 has been changed from 2 to 1 and visit number 2304 of entry 1818 has been changed from 1 to 2. In addition, location icons 2006 and 2008 have been modified so that they contain the number 2 instead of the number 1 to correspond to the change in visit number 2304. Similarly, location icons 2004 and 2010 have had their order numbers changed from 2 to 1 to reflect the change in the visit number 2302 of entry 1820. Thus, as shown in FIG. 23, the itinerary of the present invention allows for multiple maps to be entered into the itinerary and for each map to be shifted within the itinerary as desired. Further, each map automatically reflects the changes in the order of the location entries within the itinerary by altering the numbers in location icons on the map.

Together FIGS. 20, 22 and 23 provide a computer-implemented method that includes transmitting, by server 120, a first page 2000 to be displayed comprising a location entry 1818 representing a location to visit on a trip and at least two map elements 1802, 2002, the two map elements and location entry being organized as a list 2020 in a first order on the first page 2000. Server 120 receives a request to move a selected map element 2002 of the two map elements within the list 2020. Server 120 changes parameters of the selected map element 2002 to form changed parameters that change the position of the selected map element 2002 within the list 2020. Server 120 transmits a second page 2300 to be displayed based on the changed parameters, the second page 2300 comprising the location entry 1818 and the two map elements 1802, 2002 organized as a second list 2330 in a second order.

In FIG. 20, the selected map element 2002 is after a second map element 1802. The request to move selected map element 2002 is a request to move map element 2002 so that it is before the second map element 1802 and changing the parameters of selected map element 2002 involves changing the parameters of selected map element 2002 and second map element 1802 to indicate that selected map element 2002 is before second map element 1802.

In FIG. 20, the selected map element 2002 is also after location entry 1818. One of the requests to move selected map element 2002 is a request to move selected map element 2020 so that it is before location entry 1818 and changing the parameters of selected map element 2020 involves changing the parameters of selected map element 2002 and location entry 1818 to indicate that selected map element 2020 is before location entry 1818.

Using add map view button 1652, a user can add a third map element to customize itinerary page 2300. Upon receiving a request to add a third map element to customize itinerary page 2300, server 120 creates a third map element and sets parameters of the third map element to position the third map element at the end of a third list comprising the location entry, the two map elements and the third map element. Server 120 then transmits a third page to be displayed based on the changed parameters, the third page comprising the third list.

Figure 24:
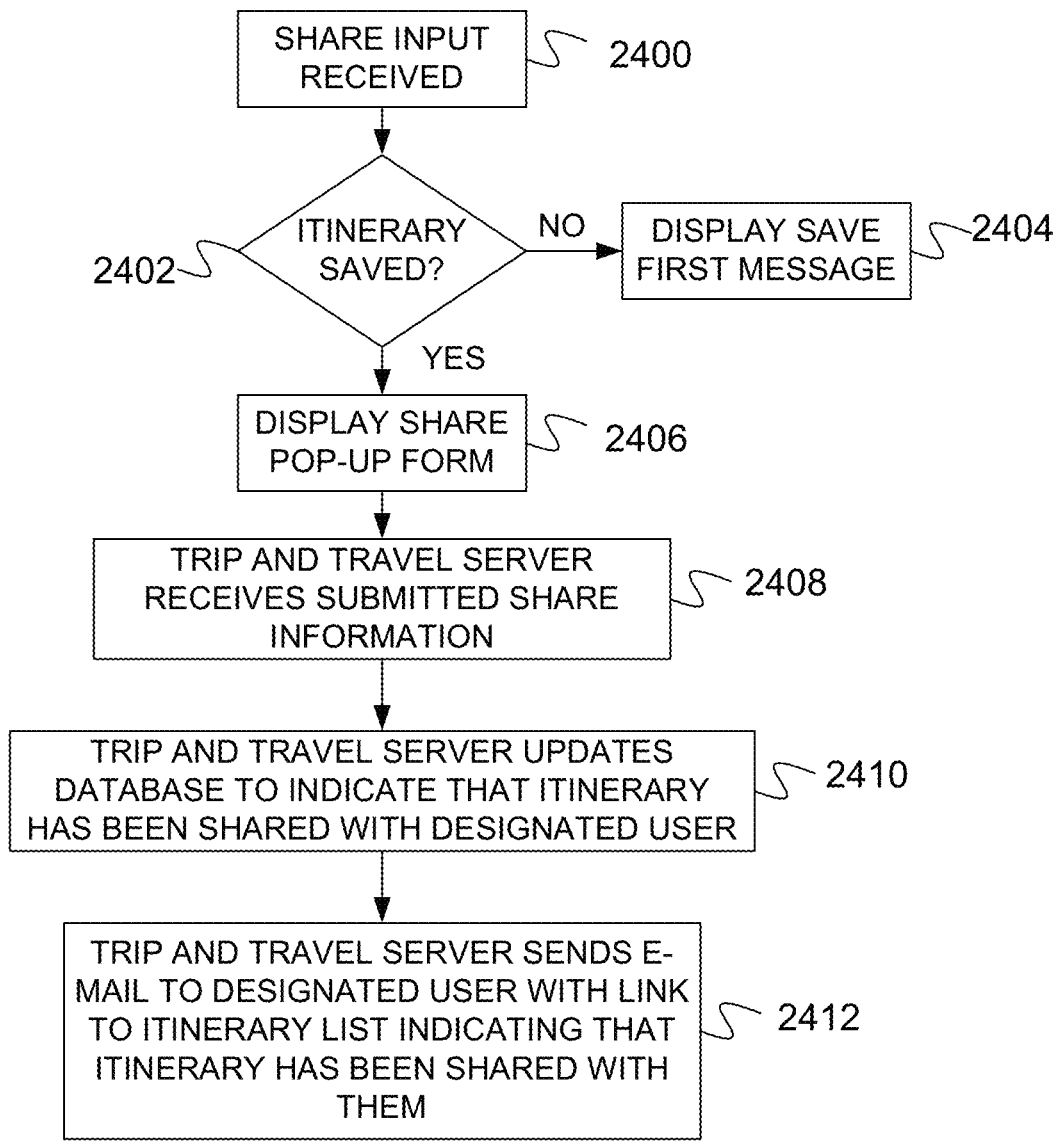
FIG. 24 is a flow diagram of a method for sharing an itinerary.

FIG. 24 provides an example of a flow diagram of a method that is performed when a user selects share itinerary button 1662 of tool box 1604 on a customize itinerary page. In step 2400, a share button input is received and forwarded to trip and travel server 120. In step 2402, trip and travel server 120 determines if the itinerary has already been saved. If the itinerary has not been saved, a save first message is displayed at step 2404 and the share process ends. If the itinerary has been saved at step 2402, trip and travel server 120 transmits a share pop-up form that is displayed at step 2406. The share pop-up form includes a text box to receive an e-mail address of the user to whom the itinerary is being shared. Optionally, the form may include a text description text block in which the user may type a brief description of the itinerary being shared. The pop-up form also includes a send or submit button that when pressed submits the e-mail address and optional itinerary description to trip and travel server 120 at step 2408. Based upon the received submitted share information, trip and travel server 120 updates itinerary table 152 to indicate that the itinerary has been shared with the designated user at step 2410. Trip and travel server 120 then constructs and sends an e-mail to the designated e-mail address found in the submitted share information at step 2412. The e-mail includes a link either directly to the destination user's itinerary page or directly to the shared itinerary.

Figure 25:
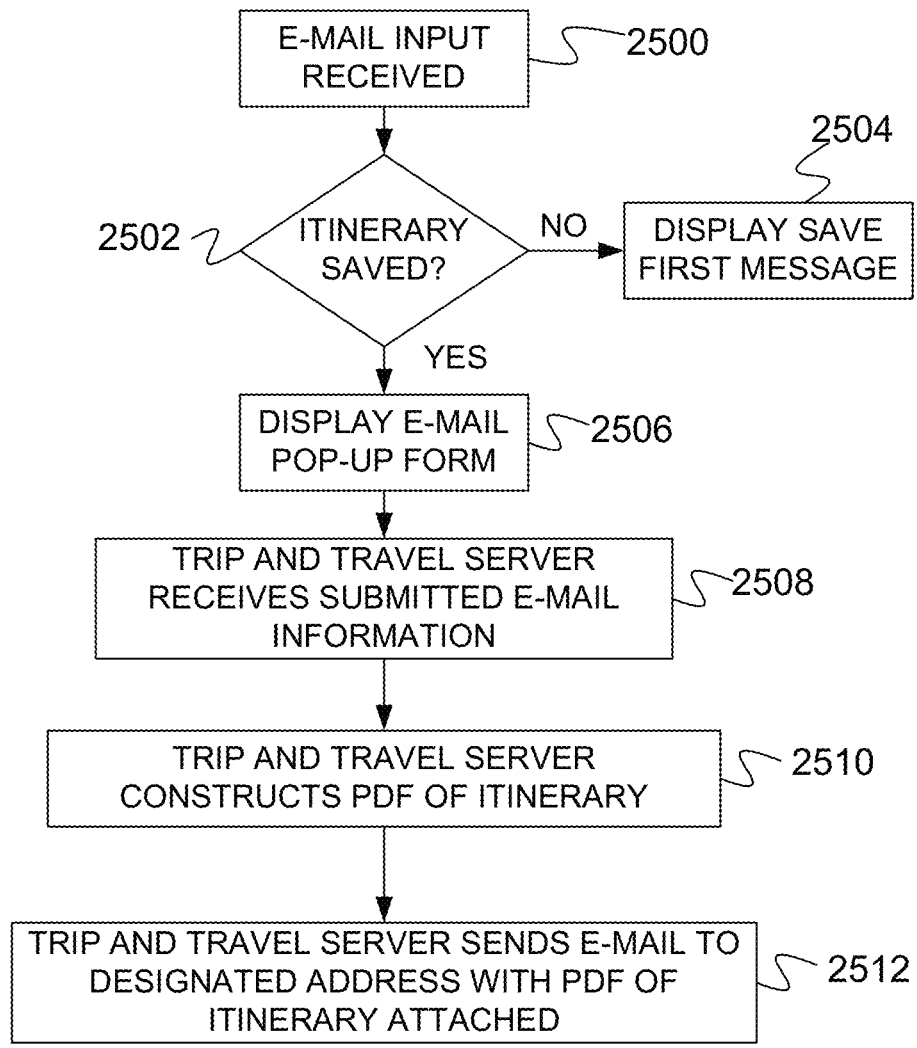
FIG. 25 is a flow diagram of a method for e-mailing an itinerary.

FIG. 25 provides a flow diagram of a method performed when e-mail itinerary button 1656 is selected by a user. At step 2500, the e-mail itinerary input is received by the client device 102 and is provided to and received by server 120. At step 2502, the server determines if the current itinerary has been saved. If the itinerary has not been saved, a save first message is displayed at step 2504 and the e-mail process ends. If the itinerary has been saved at step 2502, server 120 transmits an e-mail pop-up form that is displayed at step 2506. The e-mail pop-up form that is displayed contains a text box to receive an e-mail address and an optional text box to receive a brief description of the itinerary from the user. The pop-up form also includes a submit or send button that when selected submits the e-mail information placed in the form to server 120 at step 2508. Based on the received e-mail information, trip and travel server 120 constructs a PDF document of the saved itinerary at step 2510. At step 2512, trip and travel server 120 constructs an e-mail to the designated address found in the pop-up form, attaches the PDF of the itinerary and sends the e-mail to the designated address.

Figure 26:
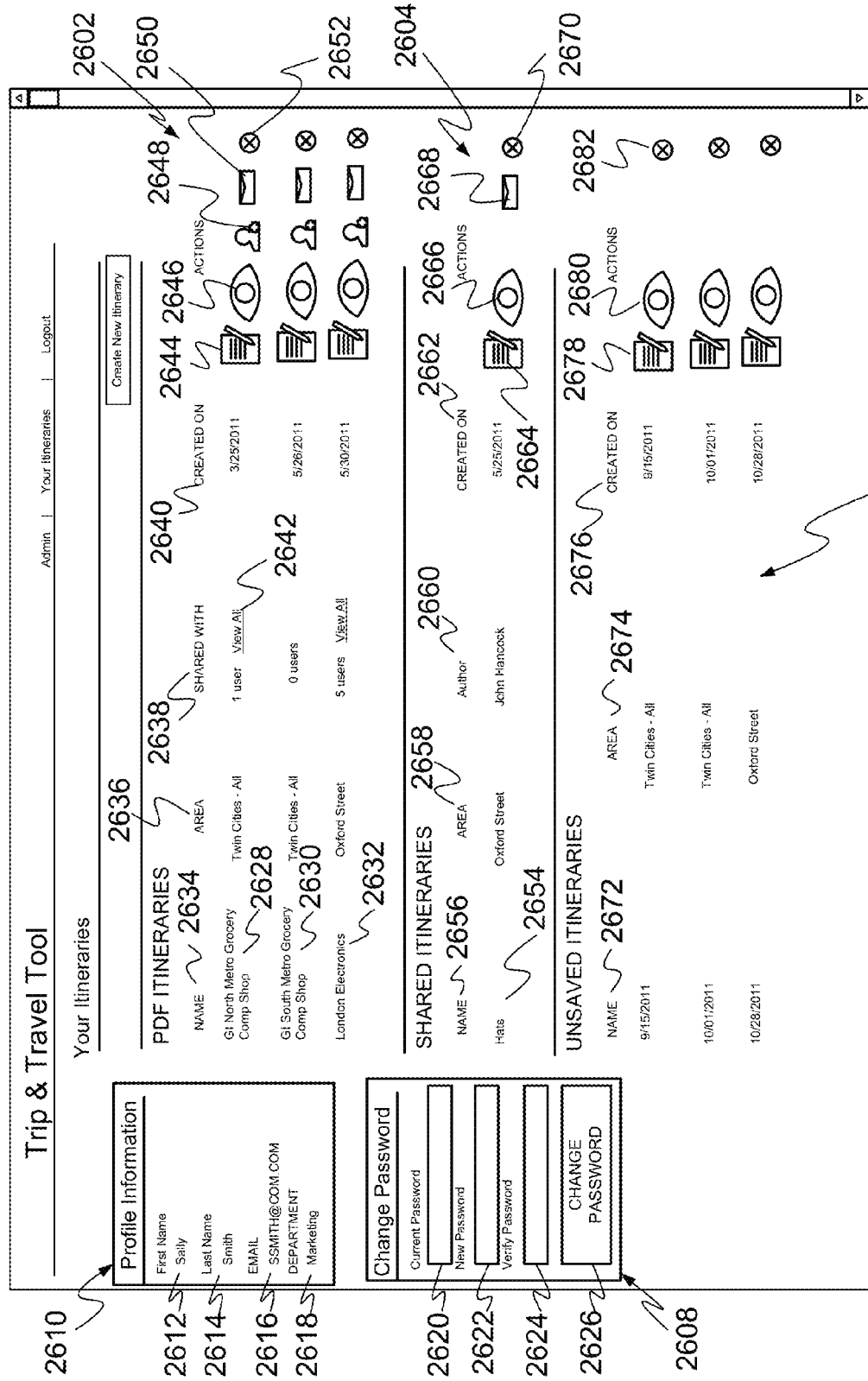
FIG. 26 is an example of a Your Itineraries page.

FIG. 26 provides an example of a Your Itineraries page 2600 that is displayed when a user selects a Your Itineraries button such as Your Itineraries button 316 of FIG. 3. Your Itineraries page 2600 includes a saved itineraries area 2602, a shared itineraries area 2604, an unsaved itineraries area 2606, a password modification area 2608, and a profile information area 2610.

Profile information area 2610 includes information about the current user including their first name 2612, last name 2614, e-mail address 2616, and department within the organization 2618. Modify password area 2608 provides text boxes for changing the user's current password including a current password text box 2620, a new password text box 2622, a verify password text box 2624 and a change password button 2626.

Saved itineraries area 2602 includes entries for itineraries that the current user has explicitly saved by pressing save button 1660 on the customize itinerary page and providing a name for the itinerary during the save operation. The saved itineraries in FIG. 26 include itinerary entries 2628, 2630, and 2632. Each saved itinerary entry includes a name 2634, an area 2636 that the itinerary covers, an indication of the number of users the itinerary has been shared with 2638 and a date the itinerary was created 2640. Shared With column 2638 includes both the number of users that the itinerary has been shared with as well as a View All link, such as View All link 2642, that when activated provides a list of all the users with whom the itinerary has been shared. Each shared itinerary entry also includes action buttons including an edit itinerary button 2644, a view itinerary button 2646, a share itinerary button 2648, an e-mail itinerary button 2650, and a delete itinerary button 2652.

Edit itinerary button 2644 opens the customize itinerary page for this itinerary; view itinerary button 2646 opens a PDF of the saved itinerary; share itinerary button 2648 opens the share pop-up window and performs the share action depicted in the flow diagram of FIG. 24; e-mail itinerary button 2650 opens an e-mail pop-up and performs the steps of the flow diagram of FIG. 25 to e-mail the itinerary to another user; and delete itinerary button 2652 deletes the current saved itinerary from server 120.

Shared itineraries area 2604 includes a list of entries for itineraries that have been shared with the current user. Each entry, such as shared itinerary entry 2654, includes a name 2656 of the itinerary, an area 2658 that the itinerary covers, an author 2660 who created the itinerary and a created-on date 2662 that represents the date the itinerary was created. In addition, each shared itinerary entry includes an edit itinerary button 2664, a view itinerary button 2666, an e-mail itinerary button 2668, and a delete itinerary button 2670.

Edit itinerary button 2664 for the shared itineraries activates a method for editing the shared itinerary and is discussed further below in connection with FIG. 27. View itinerary button 2666 causes a PDF of the shared itinerary to be displayed. E-mail itinerary button 2668 causes a pop-up e-mail form to be shown and the method of FIG. 25 to be performed. Delete itinerary button 2670 removes the itinerary from the current user's list of itineraries but does not delete the shared itinerary from the system. The shared itinerary continues to be available to the original author of the itinerary and to other users to whom the itinerary has been shared.

Unsaved itineraries area 2606 includes a list of itineraries that the user has created but not explicitly saved. In accordance with several embodiments, and as discussed above, itineraries are automatically saved by server 120 as the user adds locations and other objects to the itinerary and as the user modifies the order of objects within the itinerary. Thus, if the user exits or loses communication with server 120, the work performed on the itinerary is not lost. Because the user has not explicitly saved the itineraries in unsaved itineraries area 2606, the itineraries do not have a name. Instead, the name of the itineraries is the same as the dates the itineraries were created. Each unsaved itinerary includes a name 2672, an area that the itinerary covers 2674, and a date the itinerary was created 2676. Each itinerary entry also includes an edit itinerary button 2678, a view itinerary button 2680, and a delete itinerary button 2682. The edit itinerary button 2678 causes a customize itinerary page to be opened for the unsaved itinerary such as customize itinerary page 1600 of FIG. 16. The view itinerary button 2680 causes a PDF of the unsaved itinerary to be displayed and the delete itinerary button 2682 causes the itinerary to be deleted from the list of unsaved itineraries and from server 120 so that it is not available to any user.

Figure 27:
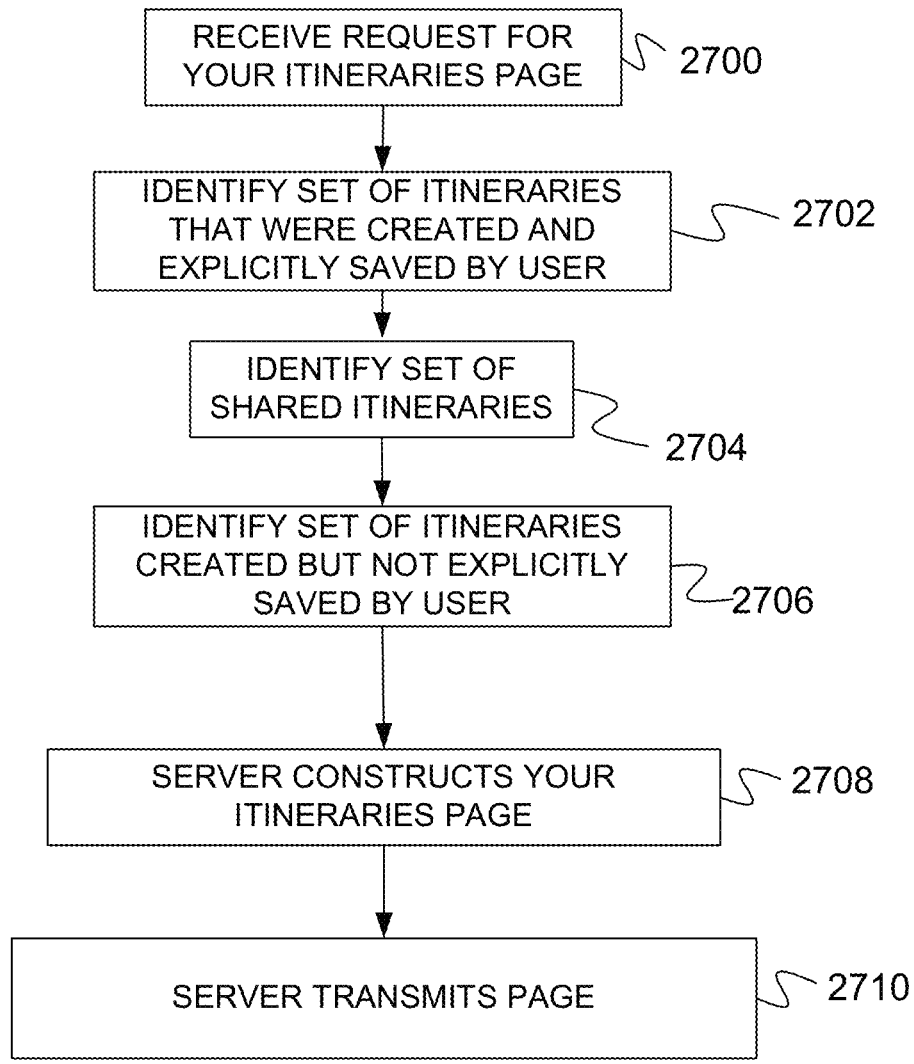
FIG. 27 is a flow diagram of a method of displaying a Your Itineraries page.

FIG. 27 provides a method of displaying Your Itineraries page 2600. In step 2700, server 120 receives a request for a page of itineraries associated with a user. At step 2702, in response to the request, server 120 identifies a set of itineraries created and explicitly saved by the user. Server 120 then identifies a set of shared itineraries that were shared with the user by other users at step 2704. At step 2706, server 120 identifies a set of itineraries created by the user but not explicitly saved by the user. At step 2708, server 120 constructs page 2600 by including entries for each itinerary in the set of itineraries created and explicitly saved by the user, for each itinerary in the set of itineraries shared with the user, and for each itinerary in the set of itineraries created by the user but not explicitly saved by the user. At step 2710, server 120 transmits page 2600 to client device 102, which renders page 2600 on the display.

Figure 28:
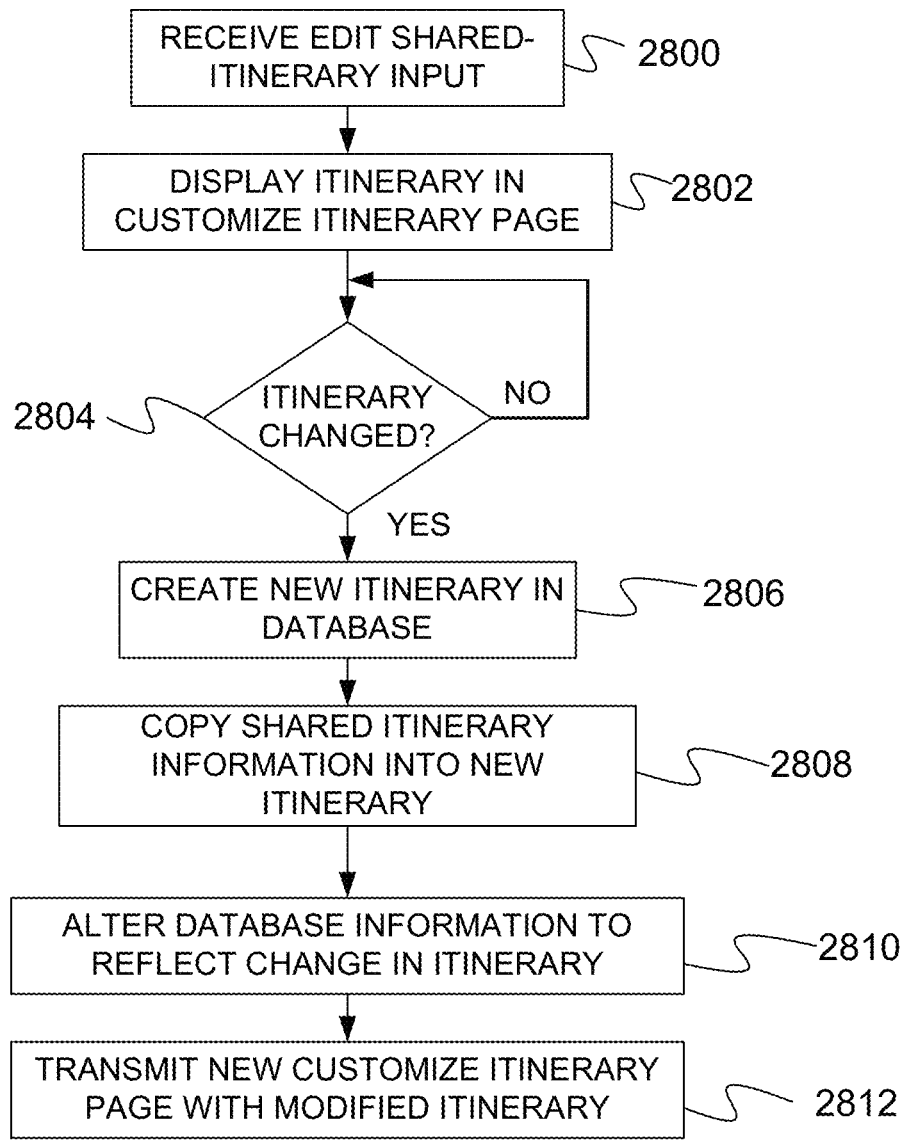
FIG. 28 is a flow diagram of a method for editing a shared itinerary.

FIG. 28 provides a flow diagram of a method invoked when a user selects edit button 2664 for a shared itinerary. At step 2800 the edit shared itinerary input 2664 is received. At step 2802, the shared itinerary is displayed in a customize itinerary page such as the customize itinerary page of FIG. 16. At step 2804, if a change in the itinerary is detected, a new itinerary is created in itinerary table 152 of database 130 at step 2806 by server 120. At step 2808, server 120 copies the information about the shared itinerary into the new itinerary record and creates itinerary objects for the new itinerary that correspond to the itinerary objects in the shared itinerary. At step 2810, server 120 alters the database entries for the new itinerary objects to reflect the modifications made by the user without modifying the database entries for the itinerary objects of the shared itinerary. Thus, if the user modifies a shared itinerary under the method of FIG. 28, a new itinerary is automatically created, altered and saved without modifying the shared itinerary. In this manner, only the original author of the shared itinerary is able to edit and change the shared itinerary. In other embodiments, the shared itinerary may be edited by anyone that it is shared with. In such embodiments, the method of FIG. 28 is not performed. Instead, each user that the itinerary is shared with is able to edit the shared itinerary using the customized itinerary page and any changes that any of the users make to the shared itinerary are saved. In some further embodiments, the author of the original itinerary is able to designate particular users that are able to edit the itineraries they create. At step 2812, server 120 transmits a new customize itinerary page containing the modified itinerary.

FIG. 28 may also be described as transmitting, by a server, a page comprising a list of itineraries shared with a user. At step 2800, server 120 receives a request to edit a shared itinerary. At step 2802, server 120 transmits a page that displays the shared itinerary and at least one control that is selectable by the user to indicate an itinerary modification. Such controls include add text separator button 1650, add map view button 1652, add more locations button 1654 and order control 1634. At step 2804, server 120 receives a request for an itinerary modification. At step 2808, based on the request, server 120 copies the shared itinerary to create a new itinerary. At step 2810, server 120 changes the new itinerary in accordance with the request for itinerary modification without changing the shared itinerary, wherein changing the new itinerary produces a modified itinerary. In accordance with some embodiments, changing the new itinerary involves storing parameters describing the modified itinerary in a database, the parameters such that the modified itinerary may be reconstructed from the parameters.

Figure 29:
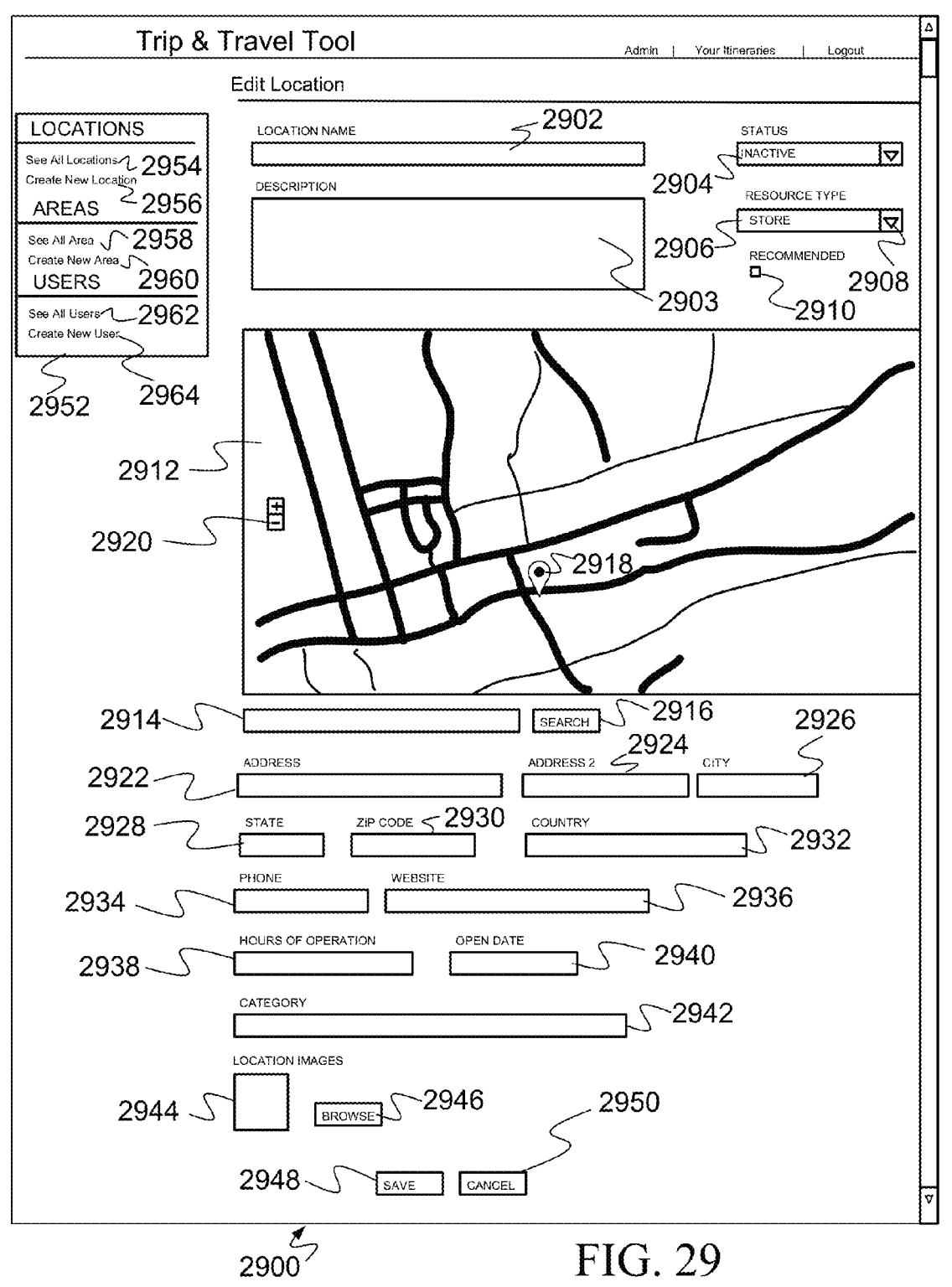

FIG. 29 provides a create/edit location page 2900, which is accessible through the admin button 314 of FIG. 3 and any other figure in which the admin button appears in the header. Create/edit location page 2900 allows an administrator to insert or edit information about a location within a particular area and includes a location name text box 2902, which accepts text representing the name of the location; brief description text box 2904, which accepts a brief description of the location; and a status box 2904, which indicates whether the current status of the location is active or inactive. An inactive status for a location means that the location may not be added to an itinerary while an active status indicates that the location may be added to an itinerary. Resource type box 2906 indicates a type for the location, such as "store", "hotel", "subway". The type may be selected from a pull down list activated by a pull down control 2908. Recommended check box 2910 may be checked to indicate whether this location is recommended by the administrator.

Edit location page 2900 also includes a map 2912, a map search box 2914 and a search submit button 2916. Map 2912 may be manipulated by the user using zoom control 2920 and by translating the map to change the geographical spans covered by map 2912. Typically, the user will manipulate map 2912 so that it has a sufficient resolution to place a location icon 2918 for the current location. In the alternative or in combination with map manipulation, the user may enter search terms into search text box 2914 and submit the search using search button 2916 to bring a particular location into view. For example, the user may enter the address of the location into the search text box and select search submit button 2916. When the search submit button 2916 is selected, the search text is submitted to map API 114, which performs a search and returns the appropriate map image 116 for the area that matches the search terms.

Figure 30:
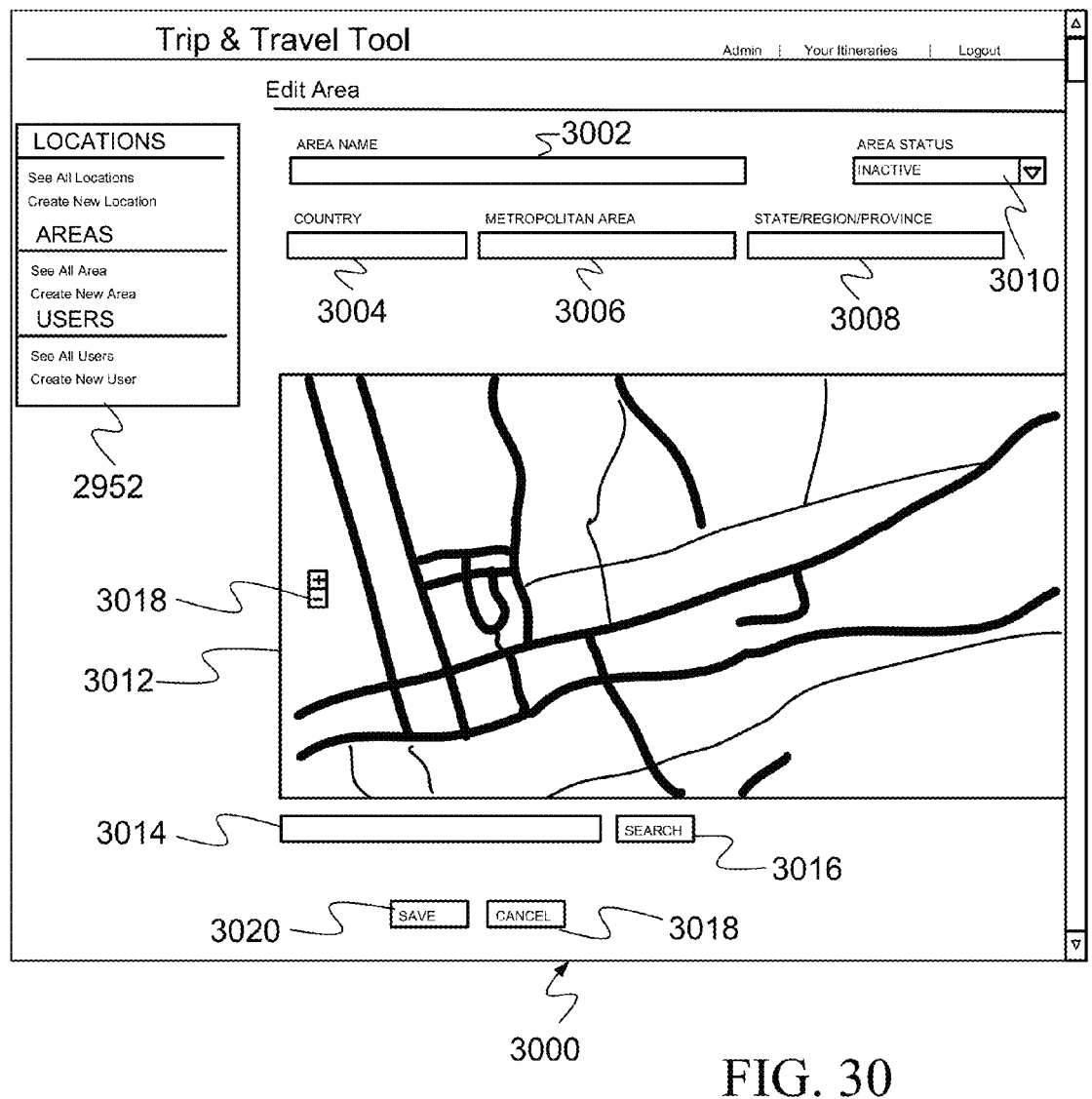
FIG. 30 is an example of a create/edit area page.

Edit location page 2900 also includes address boxes 2922, 2924, city box 2926, state box 2928, zip code box 2930, and country box 2932, which together define an address for the current location. Edit location page 2900 also includes a phone text box 2934 that receives a phone number for the location and a website address box 2936 that receives a web address for the location. Edit location page 2900 also includes an hours-of-operation box 2938 and an open date box 2940. Category box 2942 on edit location page 2900 accepts categories for the current location. A location image box 2944 displays an image that has been selected using a browse button 2946 that when selected opens a browse dialog box allowing a user to select an image to associate with the location. Upon selection of the image, the URL path to the image is stored in location table 164 of database 130. Cancel button 2950 of edit location page 2900 cancels any changes made to the current location without saving the changes and returns the user to their previously viewed page. Save button 2948 saves any changes to the location and then returns the user to their previously viewed page. Edit location page 2900 also includes administration tool box 2952, which includes links to See All Locations 2954, Create New Location 2956, See All Areas 2958, Create New Area 2960, See All Users 2962, and Create New User 2964. Selecting See All Locations 2954 causes a page to be displayed that lists all locations stored in server 120. Create New Locations 2956 causes the edit location page 2900 to be displayed. Selecting See All Users 2962 causes a page with a list of current users to be displayed and Create New User 2964 causes a new user form to be displayed in which the administrator may enter information about a new user and create a new user account. Selecting See All Areas 2958 causes a list of all areas in server 120 to be displayed and Create New Area 2960 causes an edit area page 3000 of FIG. 30 to be displayed.

Edit area page 3000 allows the user to create or edit an area that can be used by users to create itineraries. Under several embodiments, an area is a geographical span with each itinerary being associated with one area and each area containing multiple locations. Edit area page 3000 includes an area name text box 3002, a country text box 3004, a metropolitan text box 3006, and a state/region/providence text box 3008. The administrator enters the name of the area the country, metropolitan area, and state in text boxes 3002, 3004, 3006, and 3008. The administrator is also able to designate the areas as either being active or inactive using an area status box 3010. When an area is inactive users are not able to build itineraries for the area and are not able to select the area. By designating an area as inactive, the administrator can keep the area from other users until the administrator has been able to associate locations with the area.

Edit area page 3000 also includes a map 3012, an associated map search text box 3014 and a search submit button 3016. Map 3012 includes a zoom control 3018 and may be manipulated by the user. In particular, the user may zoom in or out using zoom control 3018 and may translate or shift the map using a dragging motion. Any manipulations of the map are communicated to map API 114 which returns the appropriate map images for the given manipulation.

The user may also enter text into search text 3014 and submit the text using search submit button 3016 to move to a different map location. When the user submits search text using search button 3016, the search text is submitted to map API 114 which searches an internal database to find locations that match the search term and returns a map image for a location that matches the search term. The returned map image is then displayed as map 3012.

The level of zoom or resolution selected by the administrator represents the maximum amount the user will be able to zoom out of the area when building an itinerary in either the build itinerary page or the customize itinerary page. Thus, in the build itinerary page 900, and in the customize itinerary page 1800, the maximum amount the user will be able to zoom out is the level of resolution selected in edit area 3000. The user is able to zoom into higher resolution to see more details of the map as long as the map is not at its highest resolution when set by the administrator.

Edit area page 3000 includes a cancel button 3018 that allows the user to exit edit area page 3000 without saving the changes to the area and also includes a save button 3020 that saves the changes to the area before exiting the page and returning the user to their previous page.

An example of a computing device that can be used as a server and/or client device in the various embodiments described above is shown in the block diagram of FIG. 31. The computing device 10 of FIG. 31 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the personal computer 10, is stored in ROM 18.

Embodiments above can be applied in the context of computer systems other than personal computer 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computer 10 further includes a hard disc drive 24, non-volatile solid-state memory 25 an external memory device 28, and an optical disc drive 30. External memory device 28 can include an external disc drive or solid state memory that may be attached to computer 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives, solid-state memory and external memory devices and their associated computer-readable media provide nonvolatile storage media for the personal computer 10 on which computer-executable instructions and computer-readable data structures may be stored. Such computer-executable instructions can include instructions for performing any of the steps described in the methods above. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include a browser, trip and travel tool pages 118 and program data 44 may include data stored in any of the databases or tables discussed above including the user data, itinerary data, itinerary object data, area data and location data.

Input devices including a keyboard 63 and a mouse 65 are connected to system bus 16 through an Input/output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The personal computer 10 may operate in a network environment utilizing connections to one or more remote computers, such as a remote computer 52. The remote computer 52 may be a server, a router, a peer device, or other common network node. Remote computer 52 may include many or all of the features and elements described in relation to personal computer 10, although only a memory storage device 54 has been illustrated in FIG. 31. The network connections depicted in FIG. 31 include a local area network (LAN) 56 and a wide area network (WAN) 58. Such network environments are commonplace in the art.

The personal computer 10 is connected to the LAN 56 through a network interface 60. The personal computer 10 is also connected to WAN 58 and includes a modem 62 for establishing communications over the WAN 58. The modem 62, which may be internal or external, is connected to the system bus 16 via the I/O interface 46.

Figure 31:
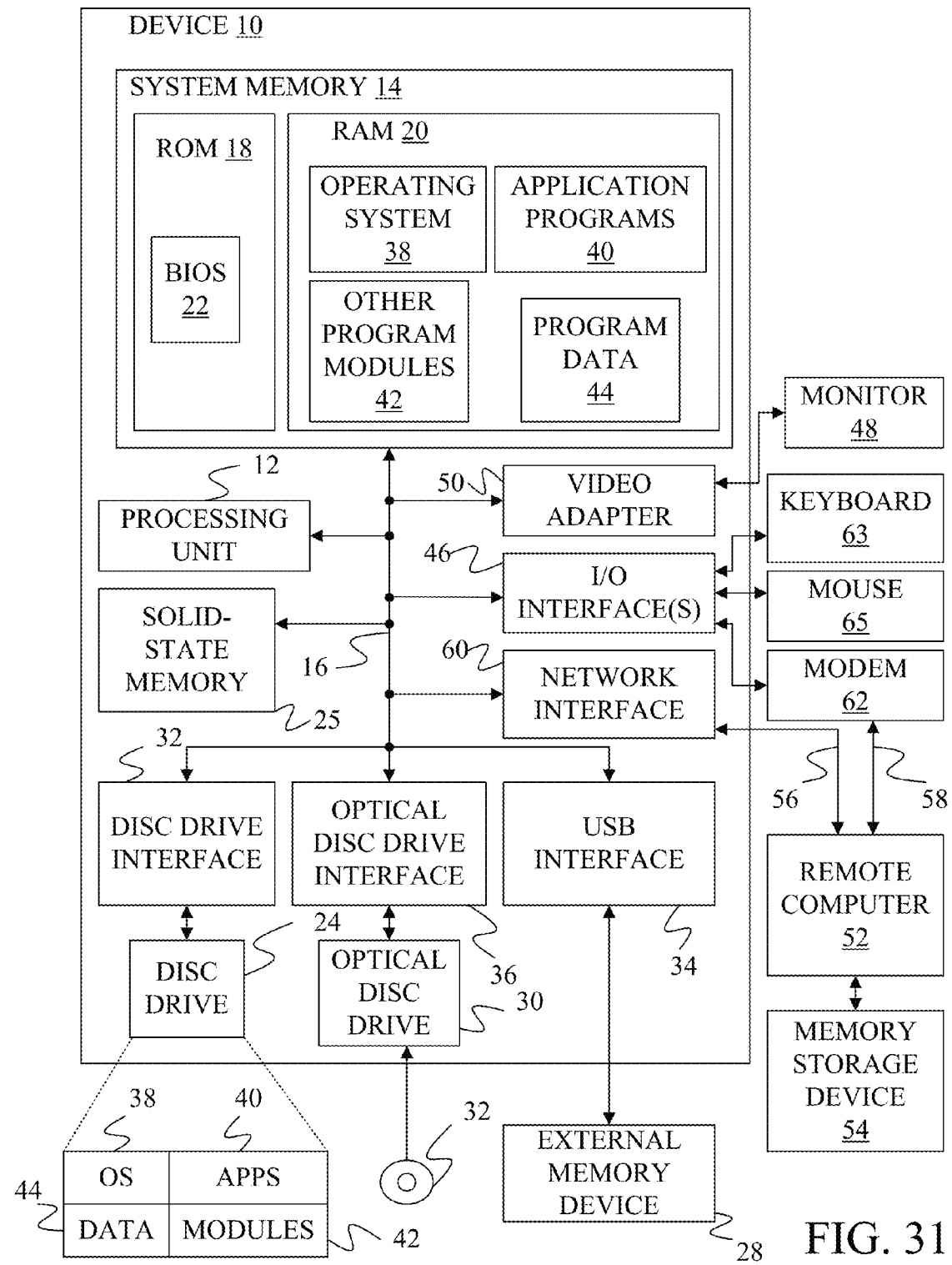
FIG. 31 is a computer block diagram showing elements used in one or more client or server devices that implement the various embodiments.

In a networked environment, program modules depicted relative to the personal computer 10, or portions thereof, may be stored in the remote memory storage device 54. For example, application programs may be stored utilizing memory storage device 54. In addition, data associated with an application program, such as data stored in the databases or tables described above, may illustratively be stored within memory storage device 54. It will be appreciated that the network connections shown in FIG. 31 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A non-transitory computer-readable medium having computer-executable instructions stored thereon that cause a processor to perform steps comprising:
   receiving a first request for a page of itineraries associated with a user;
   in response to the first request:
   identifying a set of saved itineraries created and saved by the user by selecting a save option;
   identifying a set of shared itineraries that were shared with the user by other users;
   identifying a set of unnamed itineraries created by the user but not saved by the user, the unnamed itineraries being stored in a server and identified by a creation date;
   constructing a page that includes an entry for each saved itinerary in the set of saved itineraries, an entry for each shared itinerary in the set of shared itineraries, and an entry for each unnamed itinerary in the set of unnamed itineraries; and
   transmitting the page, wherein an entry for a shared itinerary in the set of shared itineraries comprises a link to a page that allows the user to form a modified itinerary from the shared itinerary;
   receiving a second request for the page that allows the user to form a modified itinerary from the shared itinerary;
   in response to the second request, transmitting a page that displays the shared itinerary and at least one control that is selectable by the user to indicate an itinerary modification;
   receiving a third request from the user for an itinerary modification that identifies the shared itinerary; and
   in response to the third request:
   copying the shared itinerary to create a new itinerary; and
   changing the new itinerary in accordance with the user request for itinerary modification without changing the shared itinerary.

2. The computer-readable medium of claim 1 wherein an entry for an unnamed itinerary in the set of unnamed itineraries comprises a button for sharing the unnamed itinerary with another user.

3. The computer-readable medium of claim 2 further comprising:
   receiving an instruction to share a saved itinerary in the set of saved itineraries;
   in response to receiving the instruction, transmitting a page that requests an e-mail address;
   receiving the e-mail address;
   storing an indication that the saved itinerary has been shared with a user associated with the email address; and
   creating and sending an e-mail to the e-mail address indicating that the saved itinerary has been shared.

4. The computer-readable medium of claim 2 wherein an entry for a saved itinerary in the set of saved itineraries comprises a button for e-mailing the saved itinerary to another user.

5. The computer-readable medium of claim 4 further comprising:
   receiving an instruction to e-mail a saved itinerary in the set of saved itineraries;
   in response to receiving the instruction, transmitting a page that requests an e-mail address;
   receiving the e-mail address;
   converting the saved itinerary into a portable document format itinerary; and
   creating and sending an e-mail to the e-mail address with the portable document format itinerary attached.

6. A computer-implemented method comprising:
   transmitting, by a server, a page comprising a list of shared itineraries that have been shared with a user;
   receiving a user selection of one of the shared itineraries in the list of shared itineraries;
   in response to receiving the user selection, transmitting a page that displays the shared itinerary requested for editing and at least one control that is selectable by the user to indicate an itinerary modification;
   receiving a request from the user for an itinerary modification of the selected one of the shared itineraries;
   in response to the request for an itinerary modification:
   copying the shared itinerary requested for editing to automatically create a new itinerary; and
   changing the new itinerary in accordance with the user request for itinerary modification without changing the shared itinerary requested for editing, wherein changing the new itinerary produces a modified itinerary.

7. The computer-implemented method of claim 6 further comprising:
- storing parameters describing the modified itinerary in a database such that the modified itinerary may be reconstructed from the parameters; and
- transmitting a page comprising the modified itinerary.

8. The computer-implemented method of claim 6 wherein the shared itinerary requested for editing comprises two map elements in an ordered list and wherein the request for an itinerary modification comprises a request to change an ordinal position of at least one map element in the ordered list.

9. The computer-implemented method of claim 6 wherein the shared itinerary requested for editing comprises an ordered list of location entries, map elements and text separators, with each location entry providing information about a location, each map element comprising a map with at least one icon showing a geographic position of a location associated with a location entry and each text separator comprising a block of text entered by a user.

10. The computer-implemented method of claim 6 wherein the page comprising the list of shared itineraries further comprises a list of saved itineraries saved by the user and a list of unsaved itineraries created by the user but not explicitly saved by the user.

11. The computer-implemented method of claim 6 wherein the shared itinerary comprises a location entry and two map elements for said location entry in an ordered list and wherein the request for an itinerary modification comprises a request to change an ordinal position of the location entry in the ordered list.

* * * * *